(12) United States Patent
Tse et al.

(10) Patent No.: US 8,810,522 B2
(45) Date of Patent: Aug. 19, 2014

(54) METHOD FOR SELECTING AND MANIPULATING A GRAPHICAL OBJECT IN AN INTERACTIVE INPUT SYSTEM, AND INTERACTIVE INPUT SYSTEM EXECUTING THE METHOD

(75) Inventors: Edward Tse, Calgary (CA); Kathryn Rounding, Calgary (CA)

(73) Assignee: SMART Technologies ULC (CA)

(*) Notice: Subject to any disclaimer, the term of this patent is extended or adjusted under 35 U.S.C. 154(b) by 365 days.

(21) Appl. No.: 12/423,726

(22) Filed: Apr. 14, 2009

(65) Prior Publication Data
US 2010/0079493 A1  Apr. 1, 2010

Related U.S. Application Data

(63) Continuation of application No. 12/240,919, filed on Sep. 29, 2008, now abandoned.

(51) Int. Cl.
*G06F 3/041* (2006.01)
(52) U.S. Cl.
USPC ............ 345/173; 715/702; 715/790; 715/863
(58) Field of Classification Search
USPC ......................................... 715/702, 790, 863
See application file for complete search history.

(56) References Cited

U.S. PATENT DOCUMENTS

| | | |
|---|---|---|
| 3,364,881 A | 1/1968 | Kool |
| 4,372,631 A | 2/1983 | Leon |
| D270,788 S | 10/1983 | Umanoff et al. |
| D286,831 S | 11/1986 | Matyear |
| D290,199 S | 6/1987 | Hampshire |
| 4,710,760 A | 12/1987 | Kasday |
| D306,105 S | 2/1990 | Newhouse |
| D312,928 S | 12/1990 | Scheffers |
| D318,660 S | 7/1991 | Weber |
| D353,368 S | 12/1994 | Poulos |
| 5,448,263 A | 9/1995 | Martin |
| D372,601 S | 8/1996 | Roberts et al. |
| 5,568,604 A * | 10/1996 | Hansen ......................... 715/863 |
| 6,061,177 A | 5/2000 | Fujimoto |
| 6,141,000 A | 10/2000 | Martin |
| 6,337,681 B1 | 1/2002 | Martin |
| 6,339,748 B1 | 1/2002 | Hiramatsu |

(Continued)

FOREIGN PATENT DOCUMENTS

| | | |
|---|---|---|
| CN | 101198925 A | 6/2008 |
| EP | 1315071 | 5/2003 |

(Continued)

OTHER PUBLICATIONS

Press Release Contact: Patricia Corsaut, "Intuilab introduces IntuiFace, An interactive table and its application platform", Nov. 30, 2007, Intuilab Press Release.

(Continued)

*Primary Examiner* — Ke Xiao
*Assistant Examiner* — Weiming He
(74) *Attorney, Agent, or Firm* — Katten Muchin Rosenman LLP

(57) ABSTRACT

A method for selecting a graphic widget displayed on a background of an interactive input system comprises tracking one or more touch points associated with the background, and in the event that one or more touch points coincide with a location of the graphic widget, associating the coinciding touch points with the graphic widget.

4 Claims, 22 Drawing Sheets

(56) References Cited

U.S. PATENT DOCUMENTS

| | | | |
|---|---|---|---|
| D462,346 S | 9/2002 | Abboud | |
| D462,678 S | 9/2002 | Abboud | |
| 6,545,670 B1 | 4/2003 | Pryor | |
| 6,608,636 B1 | 8/2003 | Roseman | |
| 6,738,051 B2 | 5/2004 | Boyd et al. | |
| 6,747,636 B2 | 6/2004 | Martin | |
| 6,803,906 B1 | 10/2004 | Morrison et al. | |
| 6,867,886 B2 | 3/2005 | Lassen | |
| 6,972,401 B2 | 12/2005 | Akitt et al. | |
| 7,002,555 B1 | 2/2006 | Jacobsen et al. | |
| 7,129,927 B2 | 10/2006 | Mattsson | |
| 7,176,904 B2 | 2/2007 | Satoh | |
| 7,187,489 B2 | 3/2007 | Miles | |
| 7,232,986 B2 | 6/2007 | Worthington et al. | |
| 7,236,162 B2 | 6/2007 | Morrison et al. | |
| 7,274,356 B2 | 9/2007 | Ung et al. | |
| 7,327,376 B2 | 2/2008 | Shen et al. | |
| 7,372,456 B2 | 5/2008 | McLintock | |
| D571,365 S | 6/2008 | Morelock et al. | |
| D571,803 S | 6/2008 | Morelock et al. | |
| D571,804 S | 6/2008 | Morelock et al. | |
| 7,403,837 B2 | 7/2008 | Graiger et al. | |
| 7,411,575 B2 | 8/2008 | Hill et al. | |
| 7,515,143 B2 | 4/2009 | Keam | |
| 7,559,664 B1 | 7/2009 | Walleman et al. | |
| 7,593,593 B2 | 9/2009 | Wilson | |
| 7,630,002 B2 | 12/2009 | Jenkins | |
| 7,710,391 B2 | 5/2010 | Bell et al. | |
| 7,818,691 B2 * | 10/2010 | Irvine | 715/856 |
| 2001/0012001 A1 | 8/2001 | Rekimoto | |
| 2003/0137494 A1 | 7/2003 | Tulbert | |
| 2004/0032401 A1 | 2/2004 | Nakazawa et al. | |
| 2004/0149892 A1 | 8/2004 | Akitt et al. | |
| 2004/0233235 A1 | 11/2004 | Rubin et al. | |
| 2005/0104860 A1 | 5/2005 | McCreary et al. | |
| 2005/0110964 A1 | 5/2005 | Bell | |
| 2005/0122308 A1 | 6/2005 | Bell | |
| 2005/0162381 A1 | 7/2005 | Bell | |
| 2005/0183035 A1 | 8/2005 | Ringel et al. | |
| 2005/0243070 A1 | 11/2005 | Ung et al. | |
| 2006/0026521 A1 * | 2/2006 | Hotelling et al. | 715/702 |
| 2006/0044282 A1 | 3/2006 | Pinhanez et al. | |
| 2006/0114244 A1 | 6/2006 | Saxena et al. | |
| 2006/0158425 A1 | 7/2006 | Andrews et al. | |
| 2006/0279558 A1 | 12/2006 | van Delden et al. | |
| 2007/0046775 A1 | 3/2007 | Ferren et al. | |
| 2007/0273842 A1 | 11/2007 | Morrison et al. | |
| 2008/0029691 A1 | 2/2008 | Han | |
| 2008/0034320 A1 * | 2/2008 | Ben-Shachar et al. | 715/790 |
| 2008/0084539 A1 | 4/2008 | Daniel | |
| 2008/0150890 A1 | 6/2008 | Bell | |
| 2008/0150913 A1 | 6/2008 | Bell | |
| 2008/0179507 A2 | 7/2008 | Han | |
| 2008/0234032 A1 | 9/2008 | de Courssou et al. | |
| 2008/0278460 A1 | 11/2008 | Arnett et al. | |
| 2009/0027357 A1 | 1/2009 | Morrison et al. | |
| 2009/0085881 A1 | 4/2009 | Keam | |
| 2009/0103853 A1 | 4/2009 | Daniel | |
| 2009/0109180 A1 | 4/2009 | Do et al. | |
| 2009/0128499 A1 | 5/2009 | Izadi | |
| 2009/0146972 A1 | 6/2009 | Morrison et al. | |
| 2009/0153519 A1 | 6/2009 | Suarez Rovere | |
| 2009/0288043 A1 * | 11/2009 | Willis | 715/859 |
| 2010/0001963 A1 | 1/2010 | Doray et al. | |
| 2010/0020025 A1 | 1/2010 | Lemort et al. | |
| 2010/0031203 A1 * | 2/2010 | Morris et al. | 715/863 |
| 2010/0073326 A1 | 3/2010 | Keam | |
| 2010/0079385 A1 | 4/2010 | Holmgren | |
| 2010/0079409 A1 | 4/2010 | Sirotich et al. | |
| 2010/0079493 A1 | 4/2010 | Tse et al. | |
| 2010/0083109 A1 | 4/2010 | Tse et al. | |
| 2010/0177049 A1 | 7/2010 | Levy | |
| 2012/0011462 A1 * | 1/2012 | Westerman et al. | 715/773 |

FOREIGN PATENT DOCUMENTS

| | | |
|---|---|---|
| EP | 1876517 | 1/2008 |
| GB | 2404127 | 1/2005 |
| JP | 08-205113 | 8/1996 |
| WO | WO 2004/090706 | 10/2004 |
| WO | WO 2005/034027 | 4/2005 |
| WO | WO 2006/095320 | 9/2006 |
| WO | 2007121557 A1 | 11/2007 |
| WO | WO 2009/146544 | 12/2009 |

OTHER PUBLICATIONS

Overview page for IntuiFace by Intuilab, Copyright 2008.
Jacob O. Wobbrock et al., "User-Defined Gestures for Surface Computing", CHI 2009, Apr. 4-9, 2009, Boston, Massachusetts, USA.
Martin Kaltenbrunner and Ross Bencina, "reacTIVision 1.4", Released May 19, 2009 (ReacTIVision 1.0 was released Nov. 29, 2005), retrieved from <http://reactivision.sourceforge.net/#usage> on Dec. 15, 2009.
Paul D'Intino, "How I Built ORION mt" May 11, 2008 taken from <http://orionmultitouch.blogspot.com/2008/05/how-i-built-orion-mt.html> on Nov. 23, 2009.
Villamor et al. "Touch Gesture Reference Guide", Apr. 15, 2010.
Touch Panel, vol. 5 No. 4 (Nov. 2010).
Touch Panel, vol. 5 No. 2-3 (Sep. 2010).
International Search Report and Written Opinion for PCT/CA2009/001357 dated Oct. 23, 2009.
International Search Report and Written Opinion for PCT/CA2009/001356 dated Jan. 4, 2010.
International Search Report and Written Opinion for PCT/CA2010/001085 mailed Oct. 12, 2010.
Douskos V., et al., "Fully Automatic Camera Calibration using Regular Planar Patterns", Laboratory of Photogrammetry, Department of Surveying, National Technical University of Athens (NTUA), GR-15780 Athens, Greece [online], Jun. 1, 2008; http://www.isprs.org/congresses/beijing2008/proceedings/5_pdf/04.pdf.
Douskos V., et al., "Fully Automatic of Digital Cameras Using Planar Chess-board Patterns", Department of Surveying, National Technical University of Athens (NTUA), GR-15780 Athens, Greece [online], May 1, 2007; http://www.survey.ntua.gr/main/labs/photo/staffigkarras/Karras_O3DM_2007.pdf.
International Search Report and Written Opinion for PCT/CA2009/001358 dated Jan. 6, 2010.
International Search Report and Written opinion for PCT/CA2010/000002, dated Jun. 2, 2010.
International Search Report and Written Opinion for PCT/CA2009/001734 dated Feb. 23, 2010.
Hancock, M., et al. "Shallow-Depth 3D Interaction: Design and Evaluation of the One-, Two- and Three-Touch Techniques" In: CHI 2007, Proceedings of the SIGCHI Conference on Human Factors in Computing Systems, pp. 1147-1156, Apr. 28-May 3, 2007, San Jose, California.
Streitz, et al., "i-Land: an interactive landscape for creativity and innovation", Proceedings of CHI '99, 120-127.
Piper, et al. "SIDES: A Cooperative Tabletop Computer Game fo Social Skills Development", Proceedings of CSCW 2006, 1-10.
MacKenzie, "A note on the information theoretic basis for Fitts' Law", Journal of Motor Behavior, 21:323-330.
Hancock, et al. "Shallow-depth 3D interaction: design and evaluation of one-, two and three-touch techniques", in CHI '07: Proceedings of the SIGCHI Conference on Human Factos in Computing Systems, pp. 1147-1156. ACM, New York, NY USA.
Agarawal et al., "Keepin' it real: pushing the desktop metaphor with physics, piles, and the pen", in CHI '06: Proceedings of the SIGCHI Conference on Human Factors in Computing Systems, pp. 1283-1292. ACM, NY, NY, USA.
Balakrishnan et al. "Exploring bimanual camera control and object manipulation in 3D graphics interfaces." In CHI '99: Proceedings of the SIGCHI Conference on Human Factors in Computing Systems, pp. 56-62 (1999). ACM, New York, NY, USA.
Bers et al. "Interactive storytelling environments: coping with cardiac illness at Boston's Children's Hospital." In CHI '99: Proceed-

(56) References Cited

OTHER PUBLICATIONS ings of the SIGCHI Conference on Human Factors in Computing Systems, pp. 603-610 (1998). ACM Press/Addison-Wesley Publishing Co., New York, NY, USA.

Bradway "What is sandplay?" In Journal of Sandplay Therapy, vol. 15, No. 2, pp. 7-9 (2006).

Cao, et al. "Shapetouch: Leveraging contact shape on interactive surfaces." in TABLETOP 2008: 3rd IEEE International Workshop on Horizontal Interactive Human Computer Systems, pp. 129-136 (Oct. 2008).

Cassell, et al. "StoryMat: A playspace for collaborative storytelling." In CHI '99: Proceedings of the SIGCHI Conference on Human Factors in Computing Systems. ACM, New York, NY, USA (May 1999).

Cassell, et al. "Making space for voice: Technologies to support children's fantasy and storytelling." In Personal and Ubiquitous Computing, vol. 5, No. 3 (2001).

Davidson, et al. "Extending 2D object arrangement with pressure-sensitive layering cues." in UIST '08: Proceedings of the 21st annual ACM symposium on User Interface Software and Technology, pp. 87-90. ACM, New York, NY, USA (2008).

Dietz, et al. "DiamondTouch: a multi-user touch technology." In UIST '01: Proceedings of the 14th annual ACM symposium on User Interface Software and Technology, pp. 219-226. ACM, New York, NY, USA (2001).

Forlines, et al. "Under my finger: Human factors in pushing and rotating documents across the table." In Human-Computer Interaction—INTERACT 2005, vol. 3585, pp. 994-997. Springer Berlin / Heidelberg (2005).

Fröhlich, et al. "Physically-based manipulation on the Responsive Workbench." In IEEE Virtual Reality Conference 2000 (VR 2000), pp. 5-12 (Mar. 2000).

Gartner "Fast and robust smallest enclosing balls." In Proceedings of the 7th Annual European Symposium on Algorithms (ESA), pp. 325-338. Springer-Verlag (1999).

Garland, et al. "Surface simplification using quadric error metrics." in SIGGRAPH '97: Proceedings of the 24th annual conference on Computer graphics and interactive techniques, pp. 209-216. ACM Press/Addison-Wesley Publishing Co., New York, NY, USA (1997).

Michael Garland (1999). Quadric-based polygonal surface simplification. Ph.D. thesis, Carnegie Mellon University, Pittsburgh, PA, USA. Chair—Paul Heckbert.

Michael Garland (2004). "QSlim Simplification Software." Retrieved Mar. 4, 2009, URL http://mgarland.org/software/qslim.html.

Grossman et al.(Oct. 2007). "Going deeper: a taxonomy of 3D on the tabletop." In TABLETOP '07: Second Annual IEEE International Workshop on Horizontal Interactive Human-Computer Systems, pp. 137-144.

Jefferson Y. Han (2005). "Low-cost multi-touch sensing through frustrated total internal reflection." In UIST '05: Proceedings of the 18th annual ACM symposium on User Interface Software and Technology, pp. 115-118. ACM, New York, NY, USA.

Hancock, et al. (2006). "Rotation and translation mechanisms for tabletop interaction." In TABLETOP 2006: First IEEE International Workshop on Horizontal Interactive Human-Computer Systems, pp. 79-88. IEEE Computer Society, Los Alamitos, CA, USA.

Hancock, et al. (2007). "Supporting multiple off-axis viewpoints at a tabletop display." In TABLETOP '07: Second International Workshop on Horizontal Interactive Human-Computer Systems, pp. 171-178. IEEE Computer Society, Los Alamitos, CA, USA.

Hancock, et al. (2007). "Shallow-depth 3D interaction: design and evaluation of one-, two and three-touch techniques." In CHI '07: Proceedings of the SIGCHI Conference on Human Factors in Computing Systems, pp. 1147-1156. ACM, New York, NY, USA.

Hilliges, et al.(Jul. 2007). "Designing for collaborative creative problem solving." In C&C '07: Proceedings of the 6th ACM SIGCHI Conference on Creativity & Cognition. ACM, New York, NY, USA.

Hoppe, et al. (1993). "Mesh optimization." In Computer Graphics, vol. 27, no. Annual Conference Series, pp. 19-26.

Hoppe (1996). "Progressive meshes." In Computer Graphics, vol. 30, no. Annual Conference Series, pp. 99-108.

Ishii, et al. (2004). "Bringing clay and sand into digital design—continuous tangible user interfaces." In BT Technology Journal, vol. 22, No. 4, pp. 287-299.

Jacob, et al. (1994). "Integrality and separability of input devices." In ACM Transactions on Computer-Human Interaction, vol. 1, No. 1, pp. 3-26.

Kal. "Introduction to sandplay therapy." Retrieved Apr. 11, 2009, URL http://www.sandplay.org/intro to sandplay therapy.htm.

Yuri Kravchik. "JPhysX." Retrieved Mar. 4, 2009, URL http://www.jphysx.com/.

Russell Kruger, Sheelagh Carpendale, Stacey D. Scott and Anthony Tang (2005). "Fluid integration of rotation and translation." In CHI '05: Proceedings of the SIGCHI Conference on Human Factors in Computing Systems, pp. 601-610. ACM, New York, NY, USA.

Yang Li, Ken Hinckley, Zhiwei Guan and James A. Landay (2005). "Experimental analysis of mode switching techniques in pen-based user interfaces." In CHI '05: Proceedings of the SIGCHI Conference on Human Factors in Computing Systems, pp. 461-470. ACM, New York, NY, USA.

Jun Liu, David Pinelle, Samer Sallam, Sriram Subramanian and Carl Gutwin (2006). "TNT: improved rotation and translation on digital tables." In GI '06: Proceedings of Graphics Interface 2006, pp. 25-32. Canadian Information Processing Society, Toronto, Ontario, Canada.

Microsoft Corporation. "Microsoft Surface." Retrieved Jan. 20, 2009, URL http://www.surface.com/.

NVIDIA Corporation. "NVIDIA PhysX." Retrieved Jan. 20, 2009, URL http://www.nvidia.com/object/nvidiaphysx.html.

"ARB vertex buffer object." Retrieved Mar. 4, 2009, URL http://www.opengl.org/registry/specs/ARB/vertex buffer object.txt.

Piper et al. (2008). "Supporting medical conversations between deaf and hearing individuals with tabletop displays." In CSCW '08: Proceedings of the 2008 ACM Conference on Computer Supported Cooperative Work, pp. 147-156. ACM, New York, NY, USA.

Jef Raskin (2000). The Humane Interface, chap. Meanings, Modes, Monotony and Myths. Addison-Wesley.

Adrian Reetz, Carl Gutwin, Tadeusz Stach, Miguel Nacenta and Sriram Subramanian (2006). "Superflick: a natural and efficient technique for long-distance object placement on digital tables." In GI '06: Proceedings of Graphics Interface 2006, pp. 163-170. Canadian Information Processing Society, Toronto, Ontario, Canada.

Kathy Ryall, Clifton Forlines, Chia Shen and Meredith Ringel Morris (2004). "Exploring the effects of group size and table size on interactions with tabletop shared-display groupware." In CSCW '04: Proceedings of the 2004 ACM Conference on Computer Supported Cooperative Work, pp. 284-293. ACM, New York, NY, USA.

Abigail J. Sellen, Gordon P. Kurtenbach and William A. S. Buxton (1992). "The prevention of mode errors through sensory feedback." In Human-Computer Interaction, vol. 7, No. 2, pp. 141-164.

"Simplified Wrapper and Interface Generator." Retrieved Mar. 4, 2009, URL http://www.swig.org/.

Lucia Terrenghi, David Kirk, Abigail Sellen and Shahram Izadi (2007)."Affordances for manipulation of physical versus digital media on interactive surfaces." In CHI '07: Proceedings of the SIGCHI Conference on Human Factors in Computing Systems, pp. 1157-1166. ACM, New York, NY, USA.

Greg Turk (1992). "Re-tiling polygonal surfaces." In SIGGRAPH Computer. Graph., vol. 26, No. 2, pp. 55-64.

Kristina Walter (2008). "Sand Play Therapy / Sandspieltherapie nach Dora M. Kal." Retrieved Apr. 11, 2009 (public domain), URL http://commons.wikimedia.org/wiki/File:Sandspiell.jpg.

Yao Wang, Assaf Biderman, Ben Piper, Carlo Ratti and Hiroshi Ishii. "Sandscape." Retrieved Jan. 20, 2009, URL http://tangible.media.mit.edu/projects/sandscape/.

Lance Williams (1978). "Casting curved shadows on curved surfaces." In SIGGRAPH Computer. Graph., vol. 12, No. 3, pp. 270-274.

Andrew D. Wilson, Shahram Izadi, Otmar Hilliges, Armando Garcia-Mendoza and David Kirk (2008). "Bringing physics to the surface."

(56) References Cited

OTHER PUBLICATIONS

In UIST '08: Proceedings of the 21st annual ACM symposium on User Interface Software and Technology, pp. 67-76. ACM, New York, NY, USA.

Jacob O. Wobbrock, Andrew D. Wilson and Yang Li (2007). "Gestures without libraries, toolkits or training: a $1 recognizer for user interface prototypes." In UIST '07: Proceedings of the 20th annual ACM symposium on User Interface Software and Technology, pp. 159-168. ACM, New York, NY, USA.

Mike Wu and Ravin Balakrishnan (2003). "Multi-finger and whole hand gestural interaction techniques for multi-user tabletop displays." In UIST '03: Proceedings of the 16th annual ACM symposium on User Interface Software and Technology, pp. 193-202. ACM, New York, NY, USA.

Zagal, et al. (2004). "Kids telling fables through 3D animation." GVU Technical Report 23, Georgia Institute of Technology. URL http://hdl.handle.net/1853/3732.

Zagal, et al. (2006). "Social and technical factors contributing to successful 3D animation authoring by kids." GVU Technical Report 14, Georgia Institute of Technology. URL http://hdl.hand1e.net/1853/13120.

Jan. 14, 2013 Office Action for Chinese Patent Application No. 200980138448.7.

Johnny Accot and Shumin Zhai, "More than dotting i's—Foundations for crossing-based interfaces" CHI 2002, Apr. 20-25, 2002, Paper: Smooth Moves, Chi letters vol. No. 4. Issue No. 1, pp. 73-80.

Russell Kruger et al, "Fluid Integration of Rotation and Translation" CHI 2005 / Papers; Interaction, Apr. 2-7, 2005, pp. 601-610.

\* cited by examiner

| Functionality | Point-and-click | Crossing |
Standard button
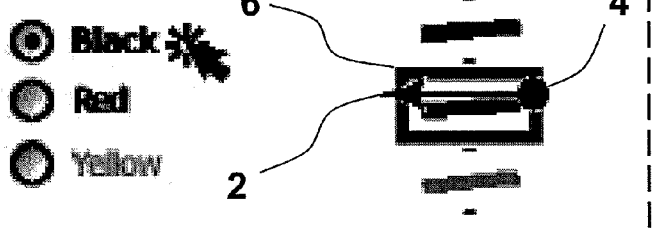
Radio button
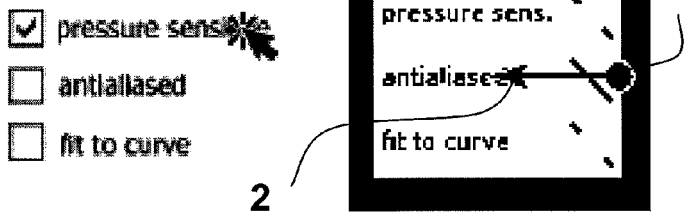
Checkbox button
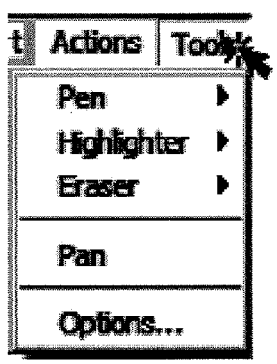
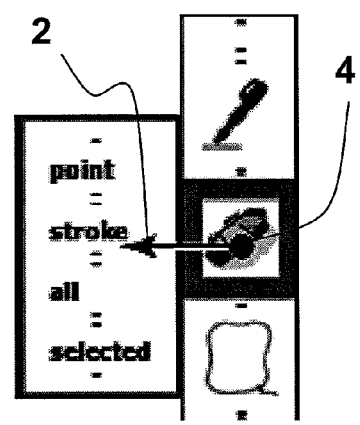
Pull-down menu
Figure 1
(Prior Art)

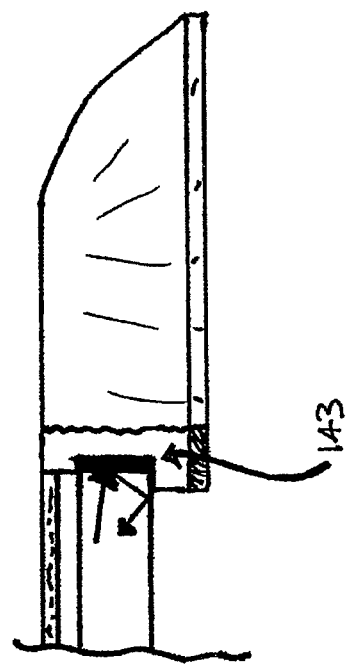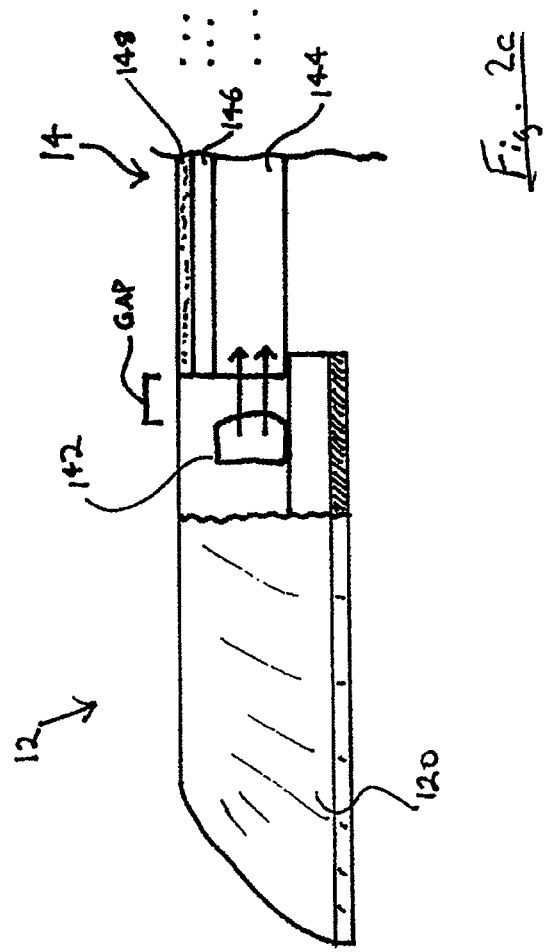
Fig. 2c

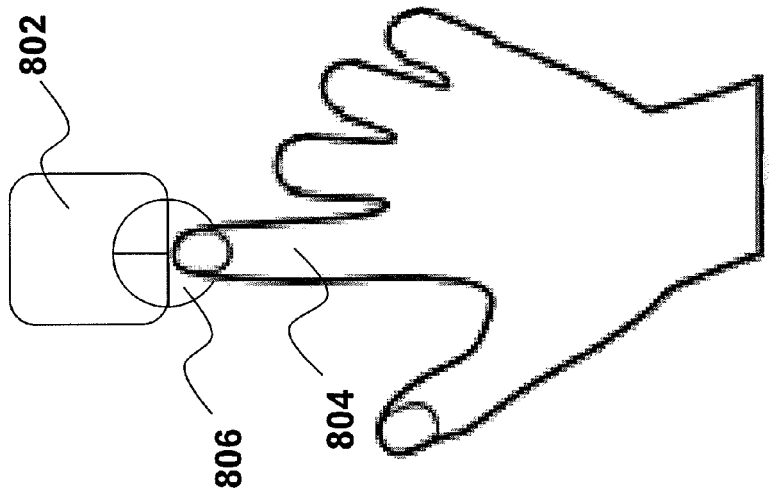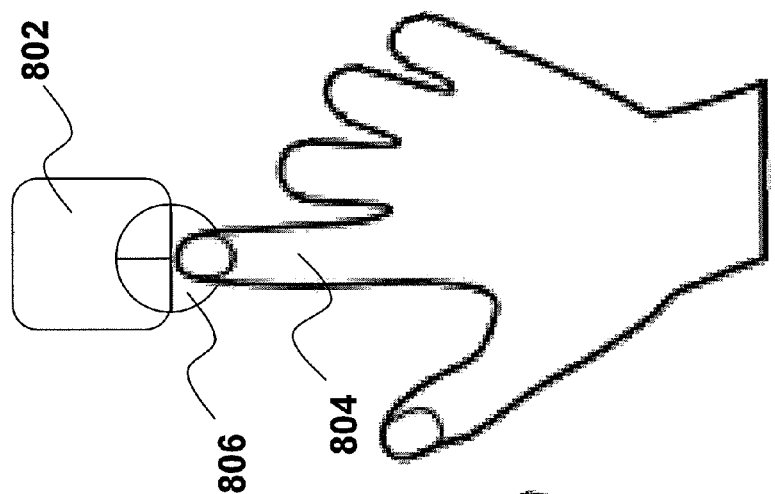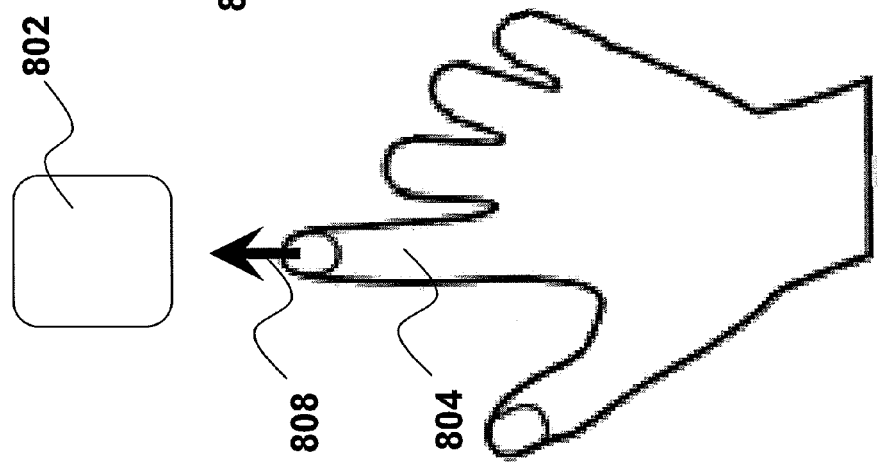

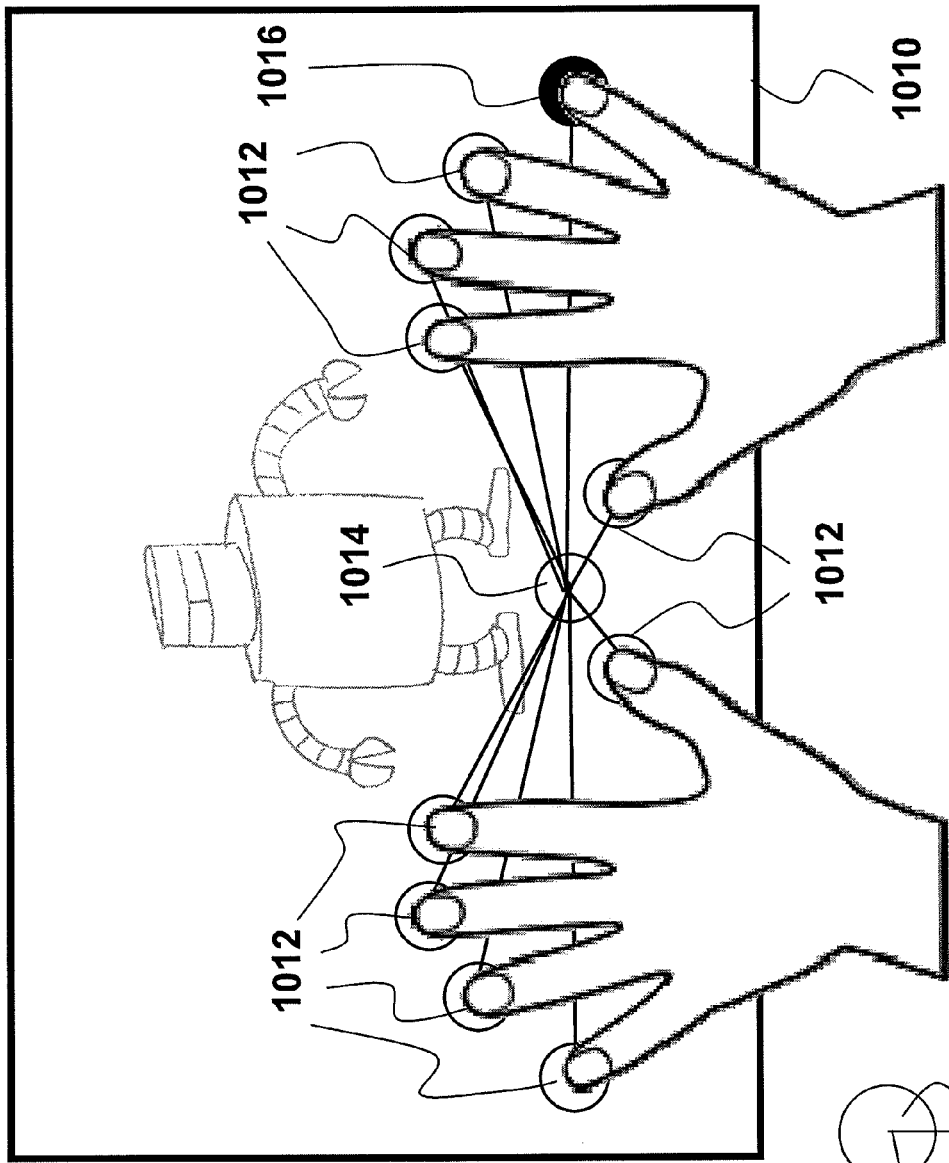
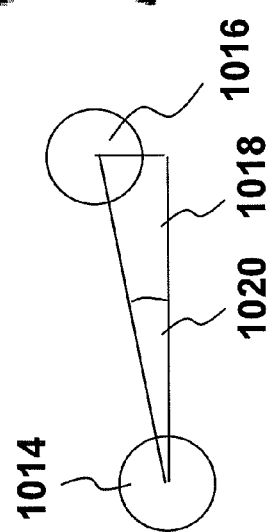
Figure 10d
Figure 10e

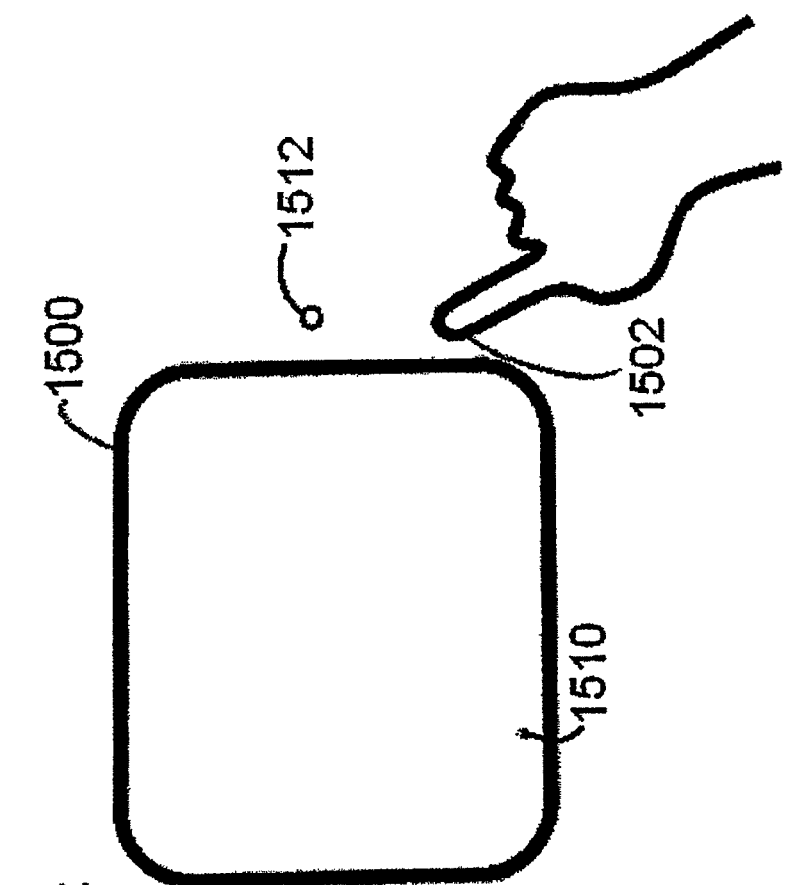
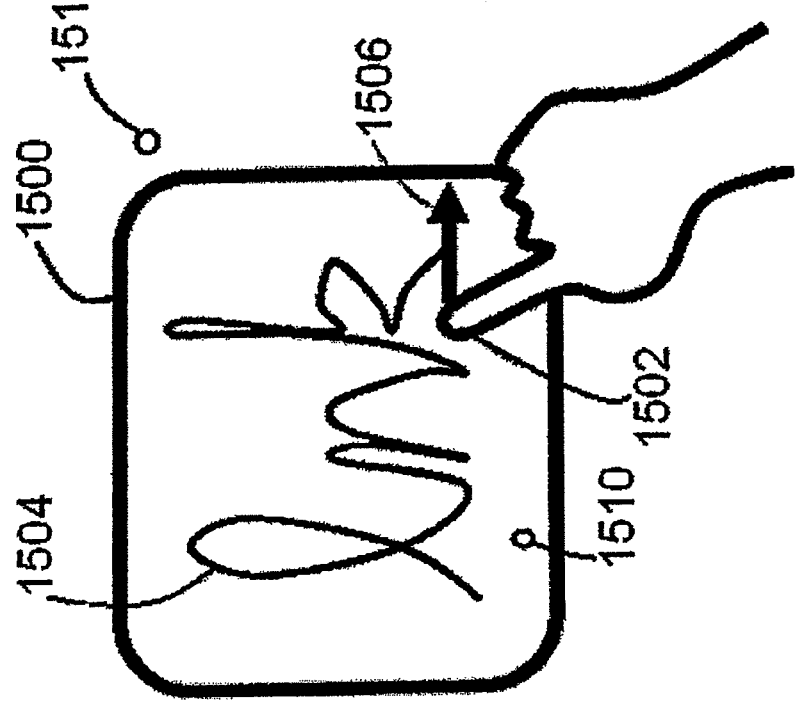
Figure 15A
Figure 15B

METHOD FOR SELECTING AND MANIPULATING A GRAPHICAL OBJECT IN AN INTERACTIVE INPUT SYSTEM, AND INTERACTIVE INPUT SYSTEM EXECUTING THE METHOD

This application is a continuation of U.S. patent application Ser. No. 12/240,919, filed Sep. 29, 2008, the entire contents of which are incorporated herein by reference.

FIELD OF THE INVENTION

The present invention relates generally to interactive input systems and in particular to a method for selecting and manipulating a graphic object in an interactive input system, and an interactive input system executing the method.

BACKGROUND OF THE INVENTION

Interactive input systems that allow users to inject input (i.e., digital ink, mouse events, etc.) into an application program using an active pointer (e.g., a pointer that emits light, sound or other signal), a passive pointer (e.g., a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the contents of which are incorporated by reference; touch systems comprising touch panels employing electromagnetic, capacitive, acoustic or other technologies to register pointer input; tablet personal computers (PCs); laptop PCs; personal digital assistants (PDAs); and other similar devices.

Multi-touch interactive input systems that receive and process input from multiple pointers using machine vision are also known. One such type of multi-touch interactive input system exploits the well-known optical phenomenon of frustrated total internal reflection (FTIR). According to the general principles of FTIR, the total internal reflection (TIR) of light traveling through an optical waveguide is frustrated when an object such as a pointer touches the waveguide surface, due to a change in the index of refraction of the waveguide, causing some light to escape from the touch point. In a multi-touch interactive input system, the machine vision system captures images including the point(s) of escaped light, and processes the images to identify the position of the pointers on the waveguide surface based on the point(s) of escaped light for use as input to application programs. One example of an FTIR multi-touch interactive input system is disclosed in United States Patent Application Publication No. 2008/0029691 to Han.

In multiple or single-touch interactive input systems, graphic objects, such as the background or "canvas", and "widgets" overlying the canvas including windows, icons, menus, pictures, text, lines, curves and shapes, are displayed on the display surface. Depending upon the application, there may be a number of graphic widgets displayed at different positions on the canvas, one or more of which may overlap with another.

In prior art interactive input systems, manipulating a graphic widget generally comprises two steps. First, a user selects a graphic widget by contacting the touch surface with a pointer at a location exactly corresponding to the location at which the graphic widget is displayed. With the widget having been selected, the user then manipulates the selected graphic widget using the pointer, for example, by moving the pointer across the display surface thereby moving the selected graphic widget. One drawback with systems requiring such touch precision on the part of the user is that the user may find it difficult to select a small widget. This may occur if the pointer occludes the small widget, if the viewing angle is extreme, or when calibration of the system renders the touch point offset somewhat from the display. Furthermore, interactive input systems of this nature do not typically employ useful feedback subsystems employing, for example, haptics.

This so-called "target acquisition" problem has previously been studied. Proposed solutions to the target acquisition problem generally fall into one of two categories of input techniques: (1) those that improve target acquisition by optimizing Fitts Law parameters; and (2) those that improve target acquisition by leveraging crossing targets.

Fitts Law is commonly used to model target acquisition, as shown by MacKenzie in the 1989 publication entitled "A note on the information theoretic basis for Fitts' Law"; Journal of Motor Behavior, 21:323-330, the content of which is incorporated entirely herein.

The Shannon formulation of Fitts Law, as shown by MacKenzie in "Movement time prediction in human-computer interfaces" in Readings in Human-Computer Interaction; Kaufmann; second edition; R. M. Baecker, W. A. S. Buxton, J. Grudin, and S. Greenberg, editors, the content of which is incorporated entirely herein, states that the movement time (MT) that it takes to acquire a target of width W and distance (or amplitude) D is predicted according to Equation 1, below:

$$MT = a + b \log_2(D/W + 1) \quad (1)$$

where:
a and b are empirically determined constants; and
the logarithmic term is the index of difficulty (ID).

Equation 1 predicts that smaller target widths and larger distances (from the current location) will increase selection time. Accordingly, target selection can be improved by decreasing target distance D, by increasing target width W, or by modifying both parameters accordingly.

Baudisch, et al., in the publication entitled "Drag-and-Pop and drag-and-pick: Techniques for accessing remote screen control on touch and pen operated systems"; Proc. Interact, 57-64, the content of which is incorporated herein in its entirety, propose reducing target distance by bringing distant targets closer to the user. This Drag-and-Pop method analyzes the directional movements of the cursor, and then brings virtual proxies of the potential targets towards the cursor (e.g., a folder or application). Studies of Drag-and-Pop showed selection to be faster for large target distances. However, the method is unable to determine whether the user intends to select a distant target versus one nearby. Thus the presence of distant objects can make selection difficult for a nearby target.

Bezerianos, et al., in the publication entitled "The Vacuum: Facilitating the manipulation of distant objects"; Proc. CHI 2005, ACM Press, 361-370, the content of which is incorporated entirely herein, propose a Vacuum method that is similar to Baudisch, et al. Drag-and-Pop method, but in addition allows the user to control the approach angle of distant targets in which they are interested. Multiple object selection is also supported. Selection time was found to be similar for single targets but significantly faster for multiple target selection.

Directly increasing the target width W by advocating a very large target area, e.g., a large button, decreases the index of difficulty. However, this requires a significant amount of screen real estate and limits the amount of content that can be placed on a smaller display.

Kabbash, et al., in the publication entitled "The 'Prince' technique: Fitts' law and selection using area cursors"; Proc. ACM CHI '95, 273-279, the content of which is incorporated entirely herein, propose increasing the target width, W, effectively by increasing the cursor size. Instead of having a single pixel hotspot as seen in standard cursors, area cursors have a larger active region for selection. By setting target width, W, to be the width of the area cursor, it was shown that selection of a single pixel target could be accurately modeled using Fitts Law. Thus, very small targets would be easier to acquire. However, area cursors are problematic in dense target spaces where multiple targets could be contained in a single area cursor.

McGuffin, et al., in the publication entitled "Fitts' law and expanding targets: Experimental studies and designs for user interfaces"; ACM TOCHI, 12(4), ACM Press, 388-422, the content of which is incorporated entirely herein, propose increasing the target size dynamically as the cursor approaches. It was found that users were able to benefit from the larger target width even when expansion occurred after 90% of the distance to the target was traveled. It was also shown that overall performance could be measured with Fitts Law by setting the target width to the size of the expanding target.

Different approaches that modify target width W and distance D dynamically adjust the control-display gain (C:D). By increasing the gain (cursor speed) when approaching a target and decreasing the gain while inside a target the motor space distance and target width are decreased and increased, respectively. Blanch, et al., in the publication entitled "Semantic pointing: improving target acquisition with control-display ratio adaptation"; Proc. ACM CHI '04, 519-525, the content of which is incorporated entirely herein, showed that performance could be modeled using Fitts Law, based on the resulting larger target W and smaller distance D in motor space. However, problems could arise when there are multiple targets, as each would slow down the cursor as it approached.

Grossman, et al., in the publication entitled "The Bubble Cursor: Enhancing target acquisition by dynamic resizing of the cursor's activation area"; Proc. CHI '05, 281-290, the content of which is incorporated entirely herein, disclosed the development of the Bubble Cursor to ease target acquisition in a sparse display. The Bubble Cursor is surrounded by a dynamically resizing bubble so that only the closest target is enveloped by the bubble. The bubble around the cursor expands until it just touches the nearest target. Although this effectively increases target width (since the bubble gets bigger), and decreases target distance (because less distance needs to be traveled to reach the target), if other targets, or distracters are nearby and within close proximity to the chosen target the size of the bubble is limited and can be much smaller. In other words, the width of the target is dependent on the distance of the closest distracters adjacent to it, as it expands so that only the closest target is selected at any time. This new target size is called the Effective Width (EW). Their study shows that Bubble Cursor's performance can be modeled using Fitts Law by setting W=EW.

U.S. Pat. No. 5,347,295 to Agulnick, et al., the content of which is incorporated entirely herein, discloses a method that, when a stylus moves into the proximity of graphic widgets, display events are triggered to provide the user a preview of what graphic widgets are targeted. For example, the appearance of a button may be expanded or altered in anticipation of its selection.

As set out above, another proposed solution category to the target acquisition problem involves leveraging crossing targets. One such technique is embodied in a crossing based drawing application called "Cross Y" for simplifying pointing tasks on a tablet computer, developed by Apitz, et al., and described in the publication entitled "CrossY: a crossing-based drawing application", Proceedings of the 17th Annual ACM Symposium on User interface Software and Technology (Santa Fe, N. Mex., USA, Oct. 24-27, 2004); UIST '04; ACM, New York, N.Y., 3-12; http://doi.acm.org/10.1145/1029632.1029635, the content of which is incorporated entirely herein.

The CrossY application enables a user to cross the target area to make a selection from a menu or a list. FIG. 1 is an exemplary diagram shown by Apitz, et al. illustrating some examples of using the CrossY technique. In each example, the dot 4 represents the position where the stylus touches the touch screen, and the arrow 2 represents the direction the stylus then moves. For example, in the example 8 of selecting the radio item "Black" from a list, the user touches the stylus over the radio item "Black", and then moves the stylus to cross the radio item 6.

While the CrossY technique is effective for object selection such as for example, clicking a button, and selecting a menu option, separate operations to move, rotate, or otherwise manipulate graphic widgets are required.

As will be appreciated, although the above-described techniques improve the user experience of selecting and manipulating graphic widgets, the possibilities of user interaction with interactive input systems have not been fully exploited. It is therefore an object to provide a novel method for selecting and manipulating a graphic object in an interactive input system, and a novel interactive input system executing the method.

SUMMARY OF THE INVENTION

According to one aspect there is provided a method for selecting a graphic widget displayed on a background of an interactive input system comprising:

tracking one or more touch points associated with the background; and in the event that one or more touch points coincide with a location of the graphic widget, associating the coinciding one or more touch points with the graphic widget.

According to another aspect there is provided a method of manipulating user input associated with a graphic widget displayed on a background of an interactive input system comprising the steps of tracking one or more touch points associated with the background;

in the event that one or more touch points coincide with a location within the graphic widget, associating the coinciding one or more touch points with the user input.

According to yet another aspect there is provided a computer readable medium embodying a computer program for selecting a graphic widget displayed on a background of an interactive input system, the computer program comprising:

program code for tracking one or more touch points associated with the background; and program code for associating the coinciding one or more touch points with the graphic widget in the event that one or more touch points coincide with a location of the graphic widget.

According to yet another aspect there is provided a computer program for manipulating user input associated with a graphic widget displayed on a background of an interactive input system, the computer program comprising:

program code for tracking one or more touch points associated with the background; and program code for associating the coinciding one or more touch points with the user input in the event that one or more touch points coincide with a location within the graphic widget.

According to a yet another aspect there is provided an interactive input system comprising:

a touch panel; and processing structure tracking one or more touch points associated with a displayed background and associating the coinciding one or more touch points with the graphic widget in the event that one or more touch points coincide with a location of the graphic widget According to still yet another aspect there is provided an interactive input system comprising:

a touch panel; and processing structure tracking one or more touch points associated with a displayed background and associating the coinciding one or more touch points with the user input in the event that one or more touch points coincide with a location within the graphic widget.

BRIEF DESCRIPTION OF THE DRAWINGS

Embodiments will now be described more fully with reference to the accompanying drawings in which:

FIG. 1 is an exemplary diagram showing a prior art technique for selecting a graphic object using crossing.

FIG. 2b is a side sectional view of the interactive input system of FIG. 2a.

FIG. 2c a sectional view of a table top and touch panel forming part of the interactive input system of FIG. 2a.

FIG. 3 is a block diagram illustrating the software structure of a host application running on the interactive input system of FIG. 2a.

FIG. 4 illustrates a finger in contact with a touch screen forming part of the interactive input system of FIG. 2a.

FIGS. 8a to 8c illustrate moving a widget using a single pointer.

FIGS. 10a to 10e illustrate moving and rotating a graphic widget.

FIGS. 15a to 15b illustrate an alternative application using crossing methods.

DETAILED DESCRIPTION OF THE EMBODIMENTS

In the following, a method for selecting and manipulating a graphical object in an interactive input system, and interactive input system executing the method are described. The method improves the usability of the interactive input system.

Figure 2A:
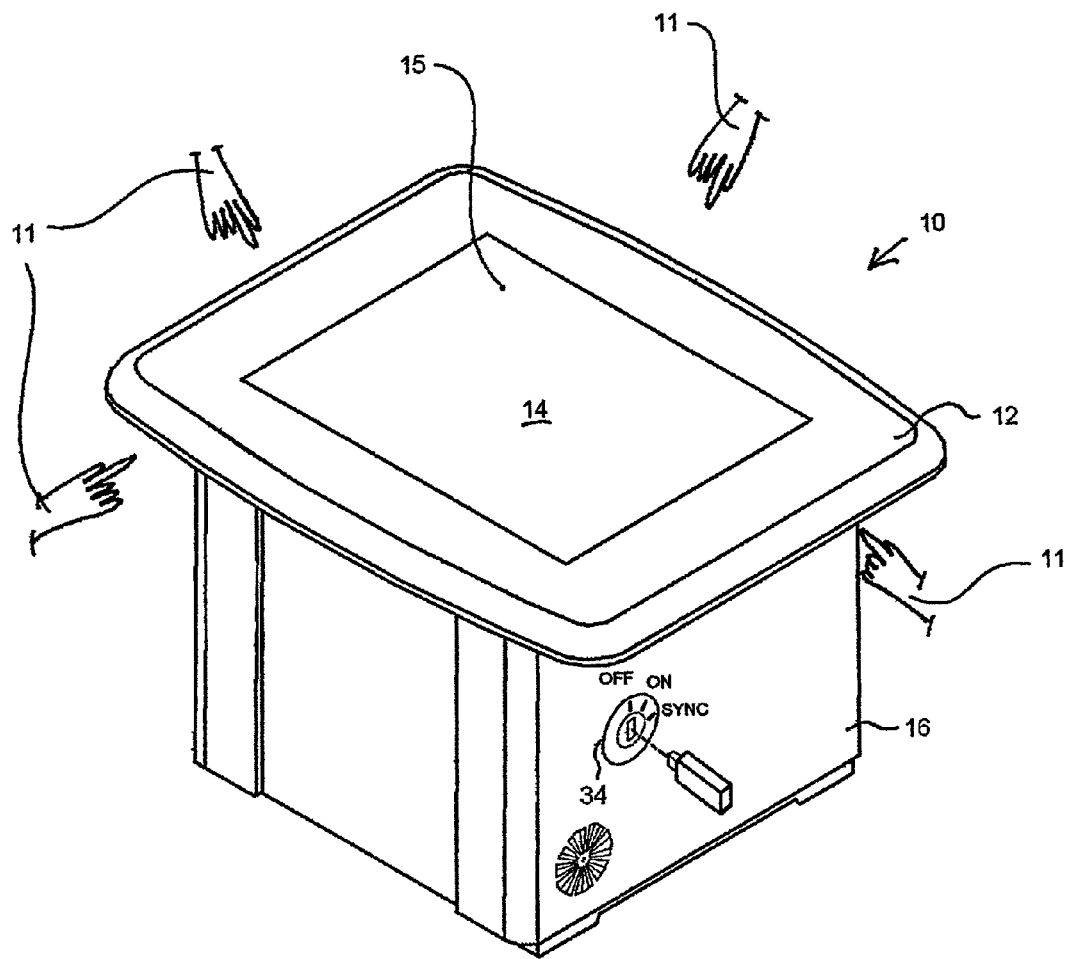
FIG. 2a is a perspective view of an interactive input system.
Figure 2B:
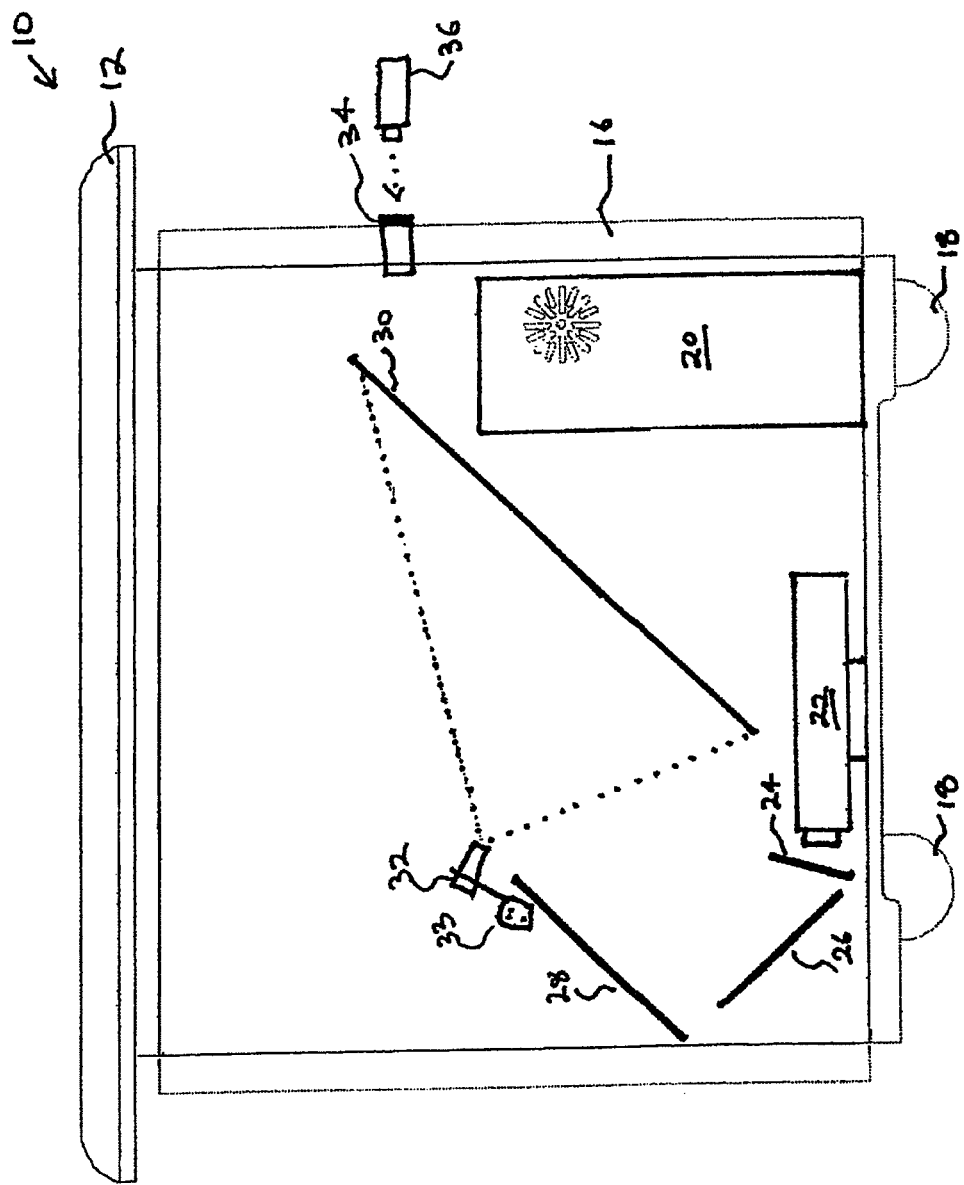

Turning now to FIGS. 2a and 2b, a perspective diagram of an interactive input system in the form of a touch table is shown and is generally identified by reference numeral 10. Touch table 10 comprises a table top 12 mounted atop a cabinet 16. In this embodiment, cabinet 16 sits atop wheels 18 that enable the touch table 10 to be easily moved from place to place in a classroom environment. Integrated into table top 12 is a coordinate input device in the form of a frustrated total internal refraction (FTIR) based touch panel 14 that enables detection and tracking of one or more pointers 11, such as fingers, pens, hands, cylinders, or other objects, applied thereto.

Cabinet 16 supports the table top 12 and touch panel 14, and houses a processing structure 20 (see FIG. 2b) executing a host application and one or more application programs, with which the touch panel 14 communicates. Image data generated by the processing structure 20 is displayed on the touch panel 14 allowing a user to interact with the displayed image via pointer contacts on the display surface 15 of the touch panel 14. The processing structure 20 interprets pointer contacts as input to the running application program and updates the image data accordingly so that the image displayed on the display surface 15 reflects the pointer activity. In this manner, the touch panel 14 and processing structure 20 form a closed loop allowing pointer interactions with the touch panel 14 to be recorded as handwriting or drawing or used to control execution of application programs.

The processing structure 20 in this embodiment is a general purpose computing device in the form of a computer. The computer comprises for example, a processing unit, system memory (volatile and/or non-volatile memory), other non-removable or removable memory (a hard disk drive, RAM, ROM, EEPROM, CD-ROM, DVD, flash memory etc.) and a system bus coupling the various computer components to the processing unit.

The processing structure 20 runs a host software application/operating system which, during execution, presents a graphical user interface comprising a background page or palette, upon which graphic widgets are displayed. In this embodiment, the graphical user interface is presented on the touch panel 14, such that freeform or handwritten ink input and other input can manipulated via pointer interaction with the display surface 15 of the touch panel 14.

FIG. 2b is a side elevation cutaway view of the touch table 10. The cabinet 16 supporting table top 12 and touch panel 14 also houses a horizontally-oriented projector 22, an infrared (IR) filter 24, and mirrors 26, 28 and 30. An imaging device 32 in the form of an infrared-detecting camera is mounted on a bracket 33 adjacent mirror 28. The system of mirrors 26, 28 and 30 functions to "fold" the images projected by projector 22 within cabinet 16 along the light path without unduly sacrificing image size. The overall touch table 10 dimensions can thereby be made compact.

The imaging device 32 is aimed at mirror 30 and thus sees a reflection of the display surface 15 in order to mitigate the appearance of hotspot noise in captured images that typically must be dealt with in systems having imaging devices that are aimed directly at the display surface 15. Imaging device 32 is positioned within the cabinet 16 by the bracket 33 so that it does not interfere with the light path of the projected image.

During operation of the touch table 10, processing structure 20 outputs video data to projector 22 which, in turn, projects images through the IR filter 24 onto the first mirror 26. The projected images, now with IR light having been substantially filtered out, are reflected by the first mirror 26 onto the second mirror 28. Second mirror 28 in turn reflects the images to the third mirror 30. The third mirror 30 reflects the projected video images onto the display (bottom) surface of the touch panel 14. The video images projected on the bottom surface of the touch panel 14 are viewable through the touch panel 14 from above. The system of three mirrors 26, 28, 30 configured as shown provides a compact path along which the projected image can be channeled to the display surface. Projector 22 is oriented horizontally in order to preserve projector bulb life, as commonly-available projectors are typically designed for horizontal placement.

An external data port/switch 34, in this embodiment a Universal Serial Bus (USB) port/switch, extends from the interior of the cabinet 16 through the cabinet wall to the exterior of the touch table 10 providing access for insertion and removal of a USB key 36, as well as switching of functions.

The USB port/switch 34, projector 22, and IR-detecting camera 32 are each connected to and managed by the processing structure 20. A power supply (not shown) supplies electrical power to the electrical components of the touch table 10. The power supply may be an external unit or, for example, a universal power supply within the cabinet 16 for improving portability of the touch table 10. The cabinet 16 fully encloses its contents in order to restrict the levels of ambient visible and infrared light entering the cabinet 16 thereby to facilitate satisfactory signal to noise performance. However, provision is made for the flow of air into and out of the cabinet 16 for managing the heat generated by the various components housed inside the cabinet 16, as shown in U.S. patent application Ser. No. 12/240,953 entitled "TOUCH PANEL FOR AN INTERACTIVE INPUT SYSTEM AND INTERACTIVE INPUT SYSTEM INCORPORATING THE TOUCH PANEL" to Sirotich, et al. filed on even date herewith and assigned to the assignee of the subject application, the content of which is incorporated herein by reference in its entirety.

As set out above, the touch panel 14 of touch table 10 operates based on the principles of frustrated total internal reflection (FTIR), as described further in the above-mentioned U.S. patent application Ser. No. 12/240,953 to Sirotich, et al., entitled "TOUCH PANEL FOR AN INTERACTIVE INPUT SYSTEM AND INTERACTIVE INPUT SYSTEM INCORPORATING THE TOUCH PANEL" and in the aforementioned Han reference.

FIG. 2c is a sectional view of the table top 12 and touch panel 14 for the touch table 10 shown in FIG. 2a. Table top 12 comprises a frame 120 supporting the touch panel 14. In this embodiment, frame 120 is composed of plastic. Touch panel 14 comprises an optical waveguide layer 144 that, according to this embodiment, is a sheet of acrylic. A resilient diffusion layer 146 lies against the optical waveguide layer 144. The diffusion layer 146 substantially reflects the IR light escaping the optical waveguide layer 144 down into the cabinet 16, and diffuses visible light being projected onto it in order to display the projected image. Overlying the resilient diffusion layer 146 on the opposite side of the optical waveguide layer 144 is a clear, protective layer 148 having a smooth touch surface. While the touch panel 14 may function without the protective layer 148, the protective layer 148 permits use of the touch panel 14 without undue discoloration, snagging or creasing of the underlying diffusion layer 146, and without undue wear on users' fingers. Furthermore, the protective layer 148 provides abrasion, scratch and chemical resistance to the overall touch panel 14, as is useful for panel longevity. The protective layer 148, diffusion layer 146, and optical waveguide layer 144 are clamped together at their edges as a unit and mounted within the table top 12. Over time, prolonged use may wear one or more of the layers. As desired, the edges of the layers may be unclamped in order to inexpensively provide replacements for the worn layers. It will be understood that the layers may be kept together in other ways, such as by use of one or more of adhesives, friction fit, screws, nails, or other fastening methods. A bank of infrared light emitting diodes (LEDs) 142 is positioned along at least one side surface of the optical waveguide layer 144 (into the page in FIG. 2c). Each LED 142 emits infrared light into the optical waveguide layer 144. Bonded to the other side surfaces of the optical waveguide layer 144 is reflective tape 143 to reflect light back into the optical waveguide layer 144 thereby saturating the optical waveguide layer 144 with infrared illumination. The IR light reaching other side surfaces is generally reflected entirely back into the optical waveguide layer 144 by the reflective tape 143 at the other side surfaces.

In general, when a user contacts the touch surface 15 with a pointer 11, the pressure of the pointer 11 against the touch panel 14 "frustrates" the TIR at the touch point causing IR light saturating an optical waveguide layer 144 in the touch panel 14 to escape at the touch point. The escaping IR light reflects off of the pointer 11 and scatters locally downward to reach the third mirror 30. This occurs for each pointer 11 as it contacts the touch surface at a respective touch point.

As each touch point is moved along the touch surface, IR light escapes from the optical waveguide layer 144 at the touch point. Upon removal of the touch point, the escape of IR light from the optical waveguide layer 144 once again ceases. As such, IR light escapes from the optical waveguide layer 144 of the touch panel 14 substantially at touch point location(s).

Imaging device 32 captures two-dimensional, IR video images of the third mirror 30. IR light having been filtered from the images projected by projector 22, in combination with the cabinet 16 substantially keeping out ambient light, ensures that the background of the images captured by imaging device 32 is substantially black. When the display surface 15 of the touch panel 14 is contacted by one or more pointers as described above, the images captured by IR camera 32 comprise one or more bright points corresponding to respective touch points. The processing structure 20 receives the captured images and performs image processing to detect the coordinates and characteristics of the one or more touch points based on the one or more bright points in the captured images. The detected coordinates are then mapped to display coordinates and interpreted as ink or mouse events by the processing structure 20 for manipulating the displayed image.

The host application tracks each touch point based on the received touch point data, and handles continuity processing between image frames. More particularly, the host application receives touch point data from frames and based on the touch point data determines whether to register a new touch point, modify an existing touch point, or cancel/delete an existing touch point. Thus, the host application registers a Contact Down event representing a new touch point when it receives touch point data that is not related to an existing touch point, and accords the new touch point a unique identifier. Touch point data may be considered unrelated to an existing touch point if it characterizes a touch point that is a threshold distance away from an existing touch point, for example. The host application registers a Contact Move event representing movement of the touch point when it receives touch point data that is related to an existing pointer, for example by being within a threshold distance of, or overlapping an existing touch point, but having a different focal point. The host application registers a Contact Up event representing removal of the touch point from the display surface 15 of the touch panel 14 when touch point data that can be associated with an existing touch point ceases to be received from subsequent images. The Contact Down, Contact Move and Contact Up events are passed to respective elements of the user interface such as graphic widgets, or the background/canvas, based on the element with which the touch point is currently associated, and/or the touch point's current position.

Figure 3:
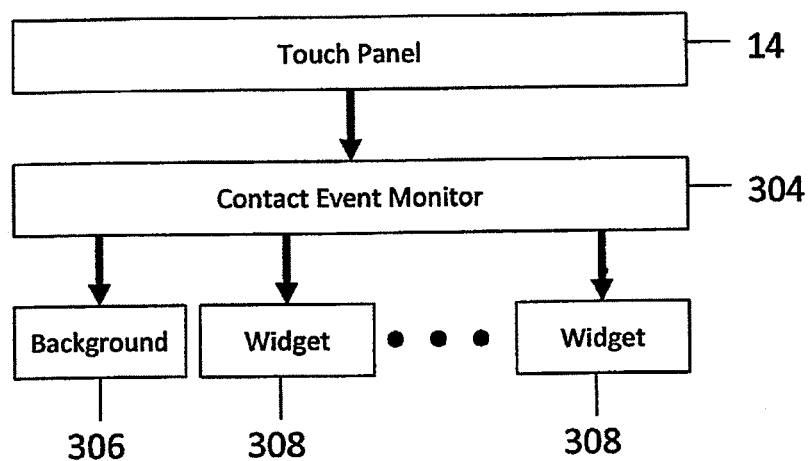

FIG. 3 is a block diagram illustrating the software structure of the host application running on the processing structure 20. A Contact Event Monitor 304 receives and tracks the touch data from the touch panel 14 directly or via an operating system. The touch data comprises position data and a unique contact ID for each of at least one touch point, as described in U.S. patent application Ser. No. 12/240,963 entitled "METHOD FOR CALIBRATING AN INTERACTIVE INPUT SYSTEM AND INTERACTIVE INPUT SYSTEM EXECUTING THE CALIBRATION METHOD" to Holmgren, et al. filed on Sep. 29, 2008 and assigned to the assignee of the subject application, the content of which is incorporated herein by reference in its entirety. The Contact Event Monitor 304 processes the received touch data and, based on the touch data generates a contact event for each touch point. Then, based on the coordinates of each touch point, the Contact Event Monitor 304 passes each contact event as an argument to either a graphic widget 308 or the background 306 if no graphic widget at the coordinates can be found. Based on the processing, the displayed image is modified to show the results of users' manipulation.

Figure 4:
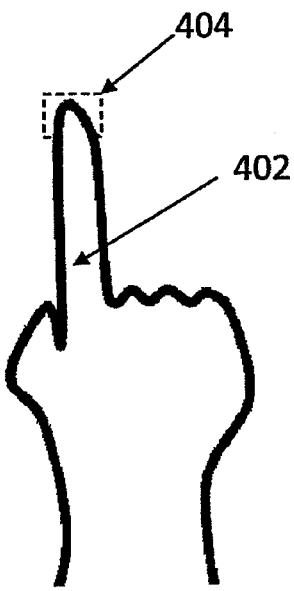

As set out above, a generated contact event is one of three types: Contact Down, Contact Move and Contact Up. A Contact Down event is generated when a touch point first appears. As illustrated in FIG. 4, each touch point in this embodiment is characterized as a rectangular touch area 404 having a center position (X,Y), a width W and a height H such that the touch area 404 approximates the position and the size of the pointer tip in contact with the touch panel 14. A Contact Move event is generated when a touch point moves. When a Contact Move event is generated, the center position (X,Y) of the touch point is updated. A Contact Up event is generated when a touch point disappears. These events are passed to one of the graphic widgets 308 or the background 306 and processed in real-time to enable users to smoothly select and manipulate the background 306 and graphic widgets 308 displayed on the touch panel 14.

The background 306 and graphic widgets 308 encapsulate functions whose input arguments include contact event data. If a Contact Down event is passed to the background 306 or a graphic widget 308, the background 306 or graphic widget 308 associates itself with the corresponding touch point, and increases the total number of touch points it is associated with by one (1).

If a Contact Move event is passed to a graphic widget 308, the widget 308 is then moved, scaled, and/or rotated depending on the attributes of the Contact Move event representing the gesture, as will be further described herein. In this embodiment, if a Contact Move event is passed to the background 306, the background 306 does not perform any actions.

If a Contact Up event is passed to the background 306 or a graphic widget 308, the background 306 or graphic widget 308 dissociates itself from the corresponding touch point, and decreases the total number of touch points with which it is associated by one (1). Further processing may be performed to cause or remove any of the aforementioned audio and/or visual effects.

Figure 5A:
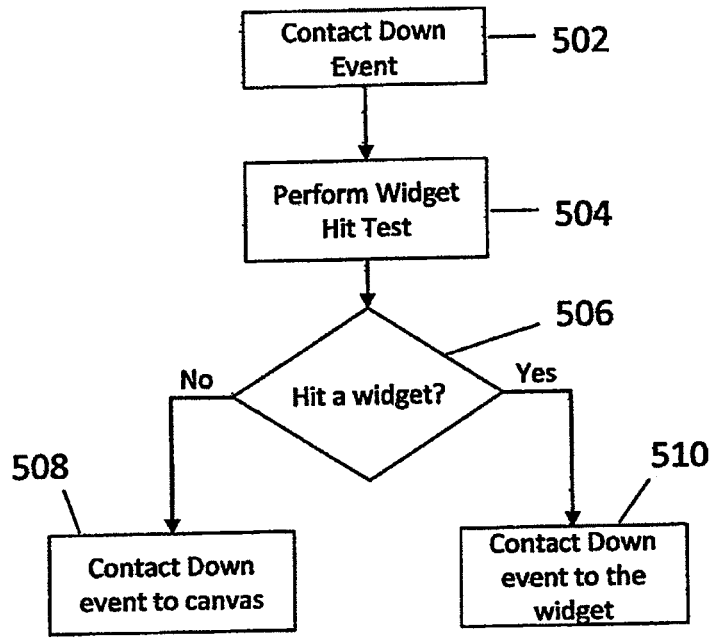
FIGS. 5a to 5c are flowcharts illustrating steps performed by a Contact Event Monitor and graphic objects to process contact events.
Figure 5C:
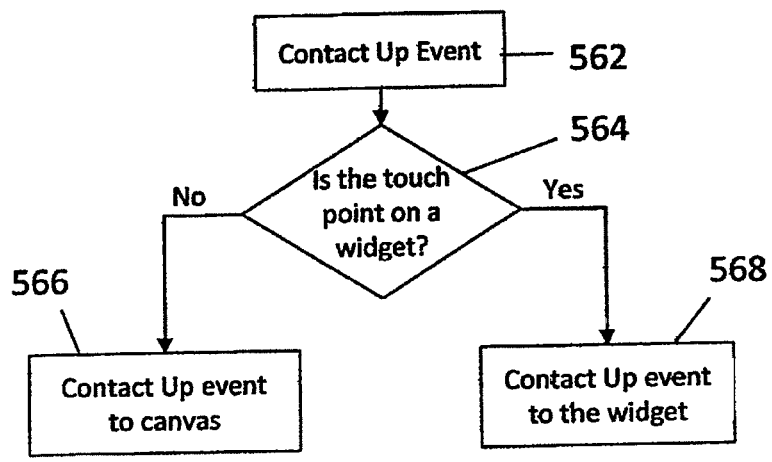
Figure 5B:
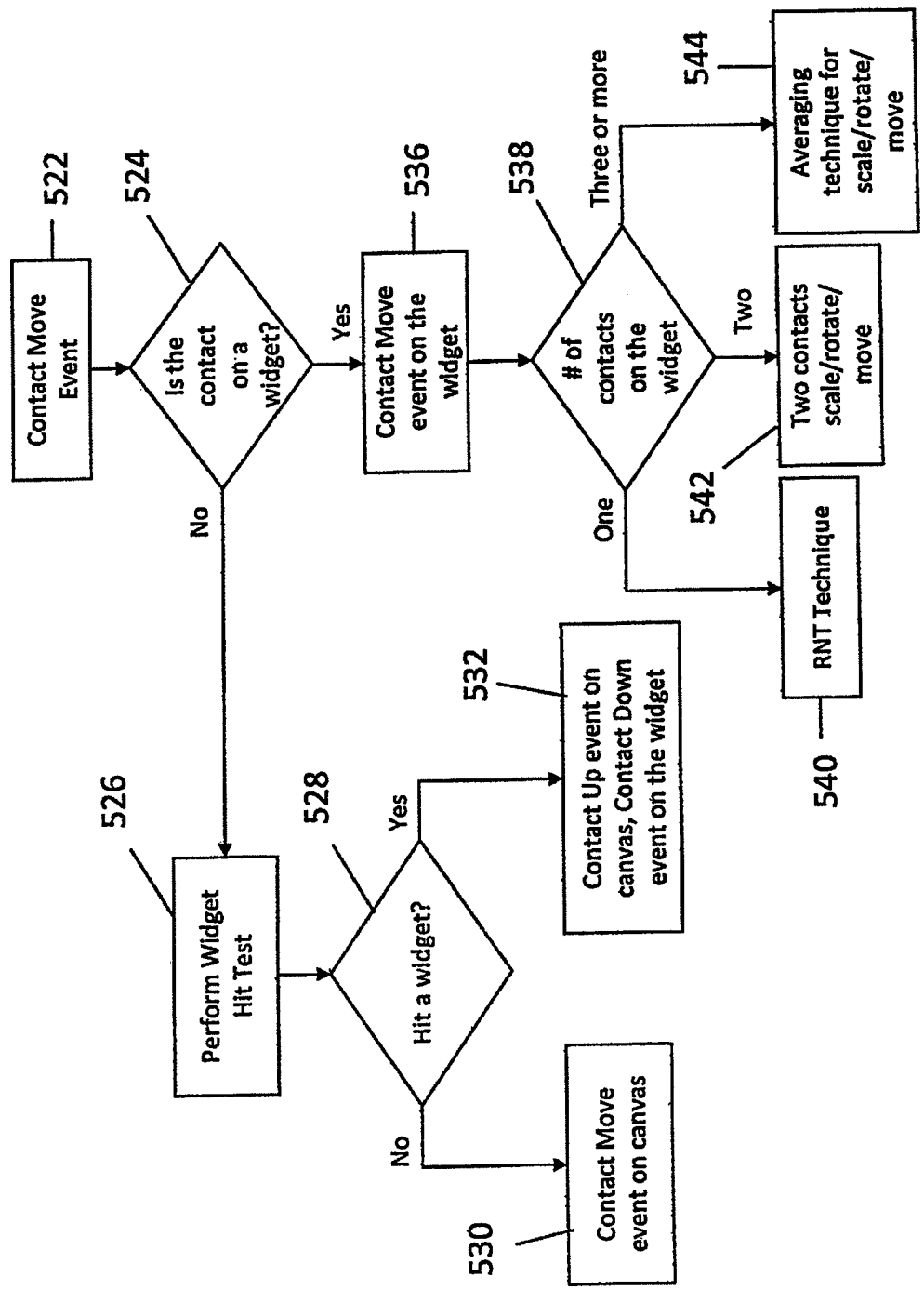

FIGS. 5a to 5c are flowcharts illustrating the steps performed by the Contact Event Monitor 304 and graphic objects such as the background 306, and graphic widgets 308 to process contact events and manipulate graphic objects using crossing. When a Contact Down event occurs (step 502), the Contact Event Monitor 304 performs a Widget Hit Test (step 504) in order to determine whether the new touch point "hit" (i.e., is on) a widget (step 506) by determining whether the new touch point corresponds to the location occupied by the graphic widget. If no graphic widget has been hit, i.e., the touch point is determined to hit the background 306, the Contact Event Monitor passes the Contact Down event to the background 306 (step 508). If the touch point hit a graphic widget 308, the Contact Event Monitor 304 passes the Contact Down event to the graphic widget 308 (step 510).

When a Contact Move event occurs (step 522), the Contact Event Monitor 304 checks if the touch point is already on a graphic widget 308 by determining if the touch point is associated with a widget 308 (step 524). If the touch point is not currently associated with a graphic widget 308, the Contact Event Monitor 304 performs a Widget Hit Test (step 526) to check if the touch point hit a widget (step 528). If no graphic widget was hit, i.e., the touch point hit the background 306, the Contact Event Monitor 304 passes the Contact Move event to the background 306 (step 530) for further processing. If the touch point coincides with a widget 308, such as the touch point crossing an edge of the widget 308, a positive Widget Hit Test is registered. In this event, the Contact Event Monitor 304 automatically simulates a Contact Up event at the same position as the Contact Move event and passes it to the background 306, and simulates a Contact Down event at the same position as the Contact Move event and passes it to the widget 308 (step 532). As a result, the Contact Event Monitor 304 enables simple and intuitive selection of the widget 308.

At step 524, if the touch point is associated with a widget 308, the Contact Event Monitor 304 passes the Contact Move event to the widget 308 (step 536). The total number of touch points associated with the widget is then checked (step 538). If the widget is associated with only one touch point, a Rotation and Translation (RNT) algorithm is used to manipulate the widget 308 (step 540). Details of a suitable RNT algorithm are set out in "Fluid Orientation on a Tabletop Display: Integrating Rotation and Translation" by Russell Kruger, et al., and published in Proceedings of the SIGCHI Conference on Human Factors in Computing Systems (CHI 2005, Portland, Oreg.), ACM Press, pages 601-610, 2005, the content of which is incorporated herein by reference in its entirety.

If, at step 538, the widget 308 is associated with two touch points, the widget 308 is manipulated based on the positions of the two touch points (step 542). In this embodiment, the middle point between the centers of the two touch points is calculated, and the angle between the line along the two touch point centers and an arbitrary baseline (e.g., the x-axis) is also calculated. As the middle point is moved, the widget 308 is also moved by the same distance and in the same direction. If the angle is changed, the widget 308 is rotated according to the angle change. The angle of widget rotation may be a multiple of the angle change. If the distance between the two touch points is decreasing, the widget 308 is scaled down. If the distance between the two touch points is increasing, the widget 308 is scaled up.

If, at step 538, the widget 308 is associated with more than two touch points, the widget 308 is manipulated by the associated touch points (step 544). In this embodiment, an averaging technique is employed whereby the centroid of the touch points associated with the widget 308 (e.g. the point on the screen surface equal to the average center point of the associated touch points) is calculated. The widget 308 is moved by the same distance and in the same direction as the centroid is moved. The movements of the associated touch points relative to the centroid are averaged to determine the amount that the widget 308 is rotated or scaled.

When a Contact Up event occurs (step 562), the Contact Event Monitor checks if the touch point is on a widget 308 by determining if the touch point is associated with a widget 308 (step 564). If the touch point is associated with the background 306, the Contact Event Monitor 304 passes a Contact Up event to the background 306 (step 566). If the touch point is associated with a widget 308, the Contact Event Monitor passes the Contact Up event to the widget 308 (step 568).

Figure 6:
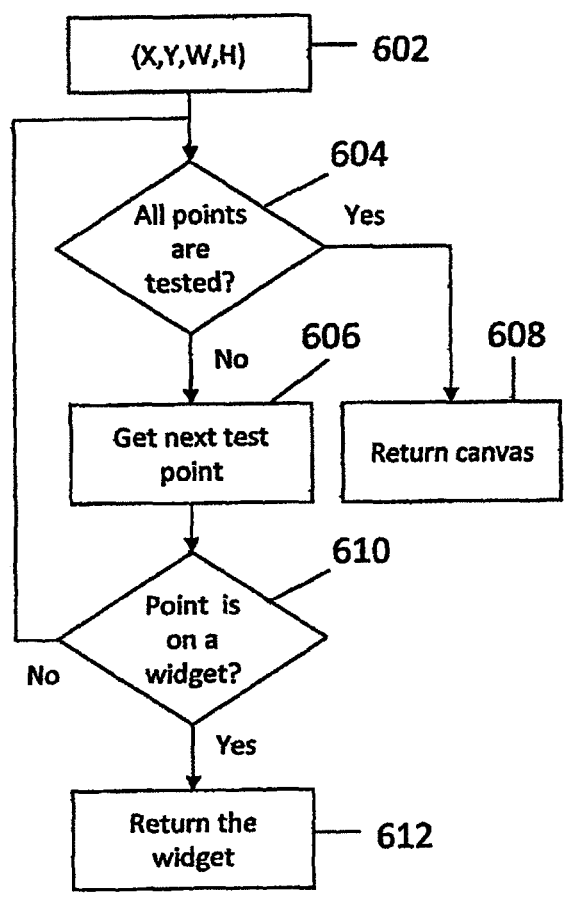
FIG. 6 is a flowchart illustrating the steps of a Widget Hit Test performed by the Contact Event Monitor.

FIG. 6 is a flowchart illustrating the steps of the Widget Hit Test performed by the Contact Event Monitor 304 at steps 504 and 526. At step 602, the Contact Event Monitor 304 generates a list of test points using the parameters (X,Y,W,H) of the touch point. The list of test points for each touch point includes its center point (X,Y) and its four corners calculated using the parameters W (width) and H (height). At step 604, the Contact Event Monitor 304 checks whether all test points in the list have been tested. If not, the Contact Event Monitor 304 retrieves the next test point from the list of test points (step 606), and calls a Point Hit Test function to check if the retrieved test point is on (i.e., shares a location with) a widget 308 (step 610). If the point is on a widget 308, the Widget Hit Test returns that widget 308 (step 612), meaning that the touch point hit the widget 308. Otherwise, the Contact Event Monitor 304 loops back to step 604. If all test points in the test point list have been tested, the touch point is considered to have hit the background 306, and the Widget Hit Test returns the background 306 (step 608).

Figure 7:
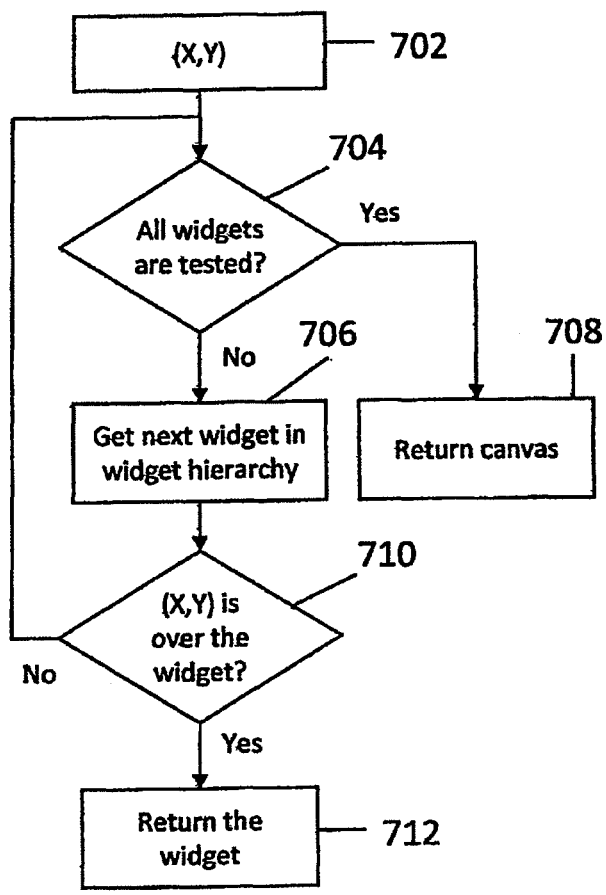
FIG. 7 is a flowchart illustrating the steps of a Point Hit Test function.

FIG. 7 is a flowchart illustrating the steps performed during the Point Hit Test at step 610. The Point Hit Test tests whether a touch point is on a widget 308 in a widget hierarchy of stacked (i.e., overlapping) widgets 308 in the order from top to bottom along the z-axis. The Point Hit Test function receives the center coordinates (X,Y) of the given test point (step 702). At step 704, if all widgets 308 have been tested, the test point is considered to have hit the background 306, and the Point Hit Test function returns the background 306 (step 708). Otherwise, the Point Hit Test function retrieves the next widget 308 in the widget hierarchy (step 706). At step 710, a test is performed to check if the test point of a touch point is over the widget 308. If the test point is over the widget 308, the Point Hit Test function returns the widget 308 (step 712); otherwise, it loops back to step 704 to test the next widget 308 in the widget hierarchy.

The crossing technique of selecting and manipulating as described above dramatically simplifies the task of manipulating large numbers of widgets 308 on an interactive input system by leveraging the inactive space surrounding a widget 308. As such, the requirement that the widget 308 be selected by touching it directly 14 is removed. The methods described above also simulate the manipulation of physical blocks on a surface in the physical realm, and allow users to select small targets on the touch panel 14 and perform object manipulations such as moving, collecting, rotating, and scaling without the requirement of accurately selecting the target on an initial touch.

FIGS. 8a to 8c illustrate moving a widget 802 using a single pointer, in this case a finger 804. In FIG. 8a, the user touches a finger 804 on the background 306 and moves the finger 804 towards the widget 802 in the direction shown by the arrow 808. In FIG. 8b, when the touch point corresponding to finger 804 crosses the edge of the widget 802, a Contact Up event is passed to the background 306, and a Contact Down event is passed to the widget 802, causing the widget 802 to be selected for manipulation. A visual effect 806 may be added to the touch point to highlight its having contacted the widget 802. In FIG. 8c, as finger 804 continues to move forward in the direction of arrow 808 or in any other direction, the widget 802 is continually passed Contact Move events, causing it to move incrementally to new positions.

Figure 9C:
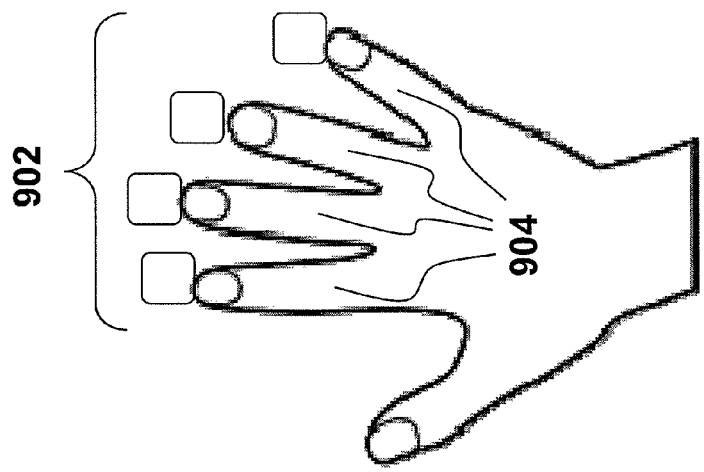
FIGS. 9a to 9d illustrate moving widgets using multiple pointers.
Figure 9B:
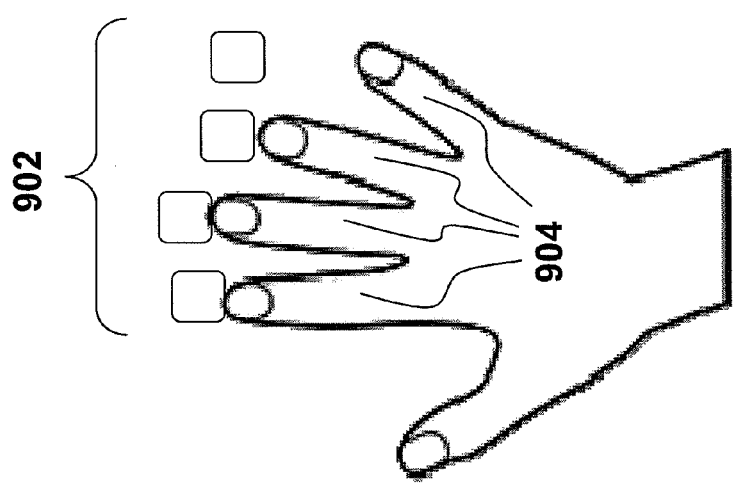
Figure 9A:
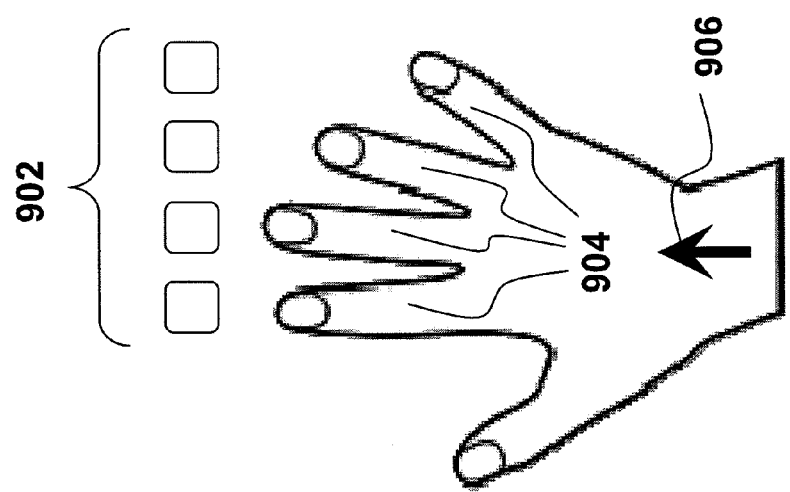

FIGS. 9a to 9c illustrate moving four widgets 902 using four pointers, in this case fingers 904. In FIG. 9a, the user touches four fingers 904 on the background 306 and moves the fingers 904 towards the four widgets 902 in the direction shown by the arrow 906. In FIG. 9b, the left three fingers 904 have crossed the edges of the left three widgets 902, respectively, causing a Contact Up event for each of the three corresponding touch points to be passed to the background 306, and a Contact Down Event to be passed to respective ones of the three widgets 902. As the fingers 904 continue in the direction shown by the arrow 906, Contact Move events for each of the three leftmost touch points are continually passed to the three contacted widgets 902 causing them to move, while Contact Move events for the rightmost touch point are passed to the background 306. In FIG. 9c, all four touch points have crossed the edges of the respective four widgets 902, and continuous movement of the touch points moves all four widgets 902 respectively.

Figure 9D:
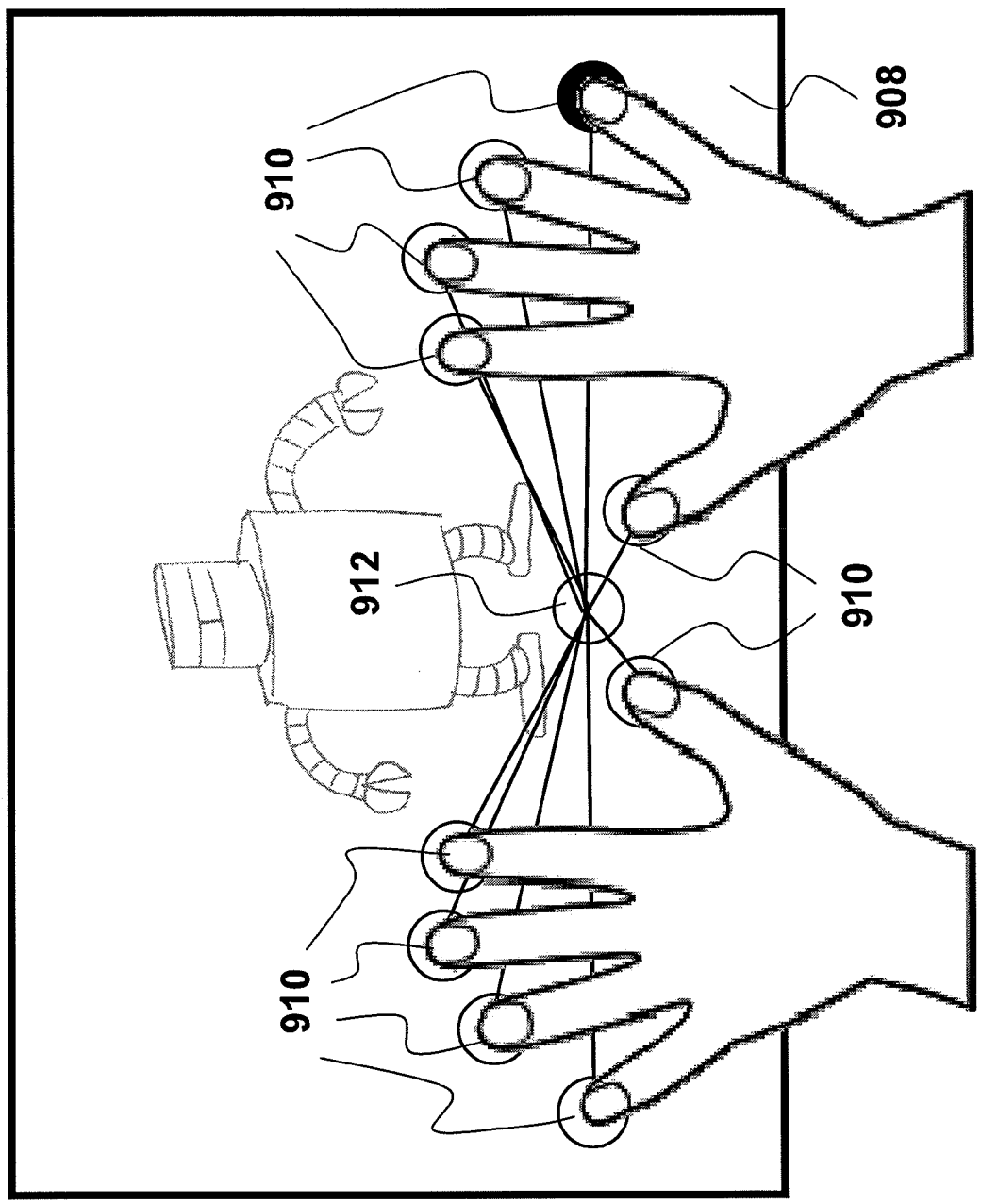

FIG. 9d shows a graphic widget 908, in this case a digital image, manipulated by ten pointers, in this case fingers, each having a respective touch point 910. As described in FIG. 5 at step 544, when more than two touch points 910 are associated with a graphic widget 908, an averaging technique is employed to determine the nature of the manipulation. The centroid 912 of the touch points 910 associated with the graphic widget 908, which is the point on the display surface equal to the average center point of all the associated touch points 910, is calculated. As the touch points 910 are moved, Contact Move events are passed to the widget 908, and the widget 908 is manipulated according to the distance and direction in which the centroid 912 moves. For example, when the user is attempting to scale the graphic widget using more than two touch points 910, then the average distance of each touch point from the centroid 912 is determined. If the average distance increases, then the widget 908 is enlarged. If the average distance decreases, then the widget 908 is decreased in size. The change in scale for enlarging or shrinking the widget 908 is directly proportional to the average distance value.

Figure 10C:
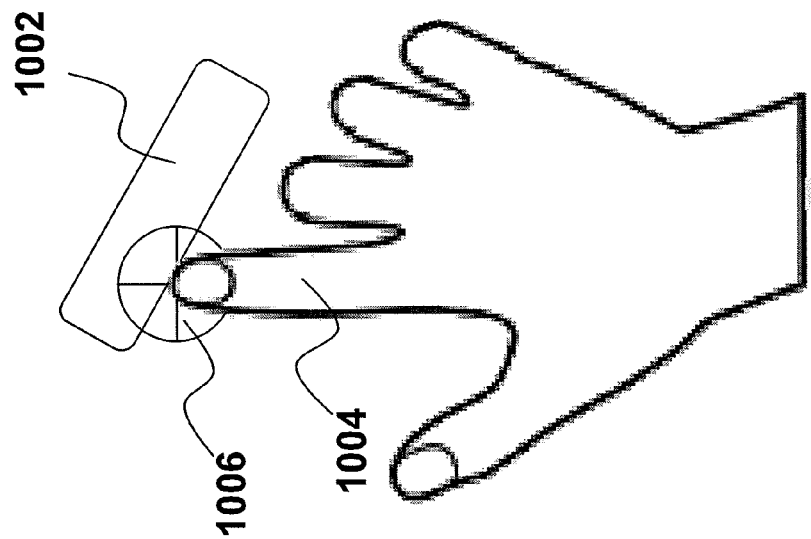
Figure 10B:
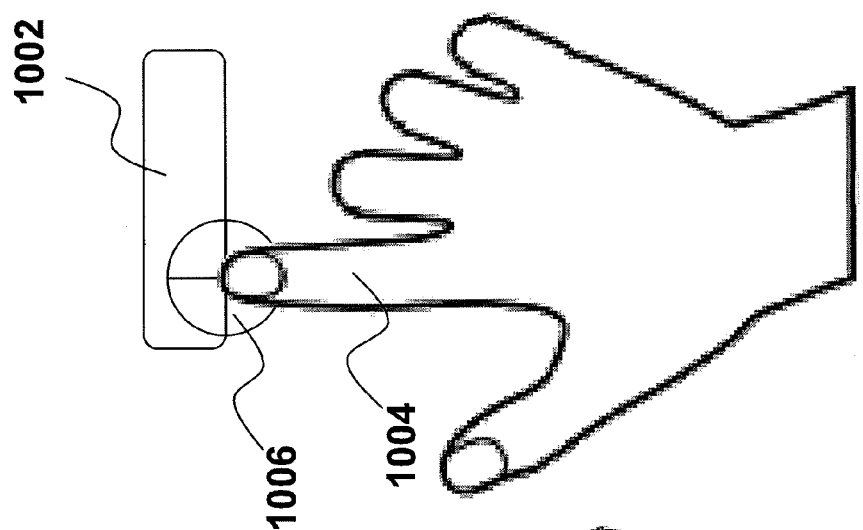
Figure 10A:
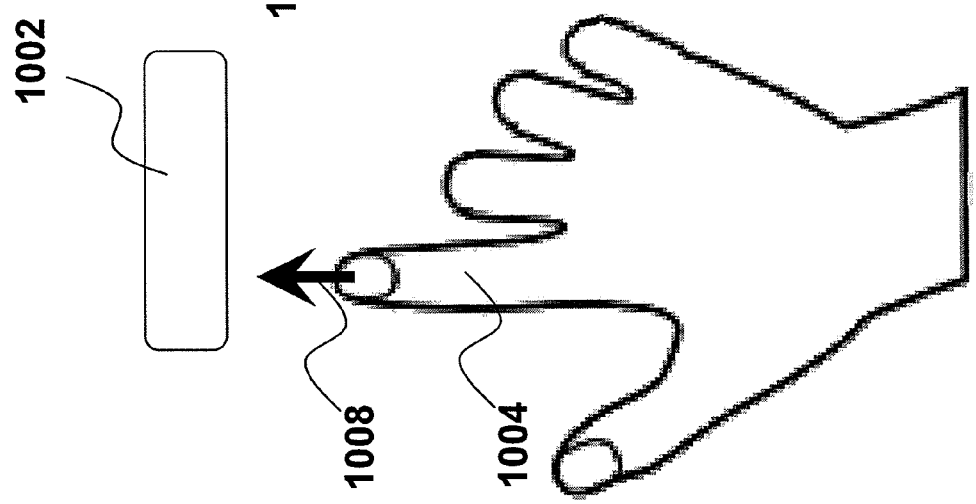

FIGS. 10a to 10c illustrate moving and rotating a widget 1002 using a single pointer, in this case a finger 1004, and by using the RNT algorithm. In FIG. 10a, the user touches the background 306 using finger 1004, and moves the finger 1004 towards the widget 1002 in the direction shown by the arrow 1008. In FIG. 10b, when the touch point corresponding to finger 1004 crosses the edge of the widget 1002, a Contact Up event is passed to the background 306, and a Contact Down event is passed to the widget 1002, causing the widget 1002 to be selected for manipulation. In this embodiment, a visual effect 1006 is added to the touch point to highlight its contact with the widget 1002. In FIG. 10c, the finger 1004 moves forward on the touch panel. Because the corresponding moving touch point on the widget 1002 is off the center point of the contacted edge, the widget 1002 is thus moved and rotated at the same time, as would a physical object in contact with the finger 1004.

In FIG. 10d, a widget 1010 associated with ten touch points 1012 corresponding to fingers on a user's hands is rotated by the user. In this embodiment, the number of touch points 1012 on or at the edge of the graphic widget 1010 is determined. The centroid 1014 or average position of all the touch points 1012 on or at the edge of the widget 1010 is calculated. The outermost last touch point 1016 of all the contact areas 1012 from the centroid 1014 is then determined. As shown in FIG. 10e, the angle 1020 from the centroid 1014 between the last touch point 1016 and a horizontal line 1018 (as defined by the longest edge of the touch surface) is calculated. Alternatively, the angle 1020 from the centroid 1014 between the last touch point 1016 and a vector of known orientation (translated to the centroid) may also be calculated. When this angle 1020 changes in degrees around the centroid 1014 from the previously saved angle as the user's hands rotate, the widget 1010 is rotated accordingly. In this embodiment, the angles are measured between −180 degrees to 180 degrees. In the case where the angle change is out of this range, the angle change is wrapped into this range before any further processing. For example, if the angle change is smaller than −180 degrees, 360 degrees is added to the angle thereby wrapping it. Similarly if the angle is larger than 180 degrees, it is wrapped by subtracting 360 degrees. The wrapped angle difference is then used to rotate the graphic widget 1010.

Figure 11C:
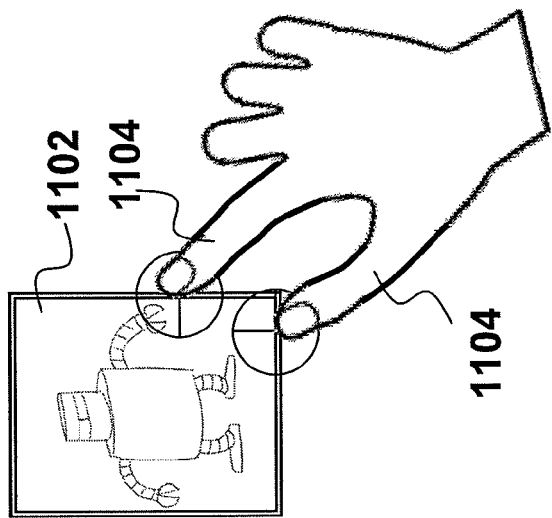
FIGS. 11a to 11g illustrate resizing a picture using multiple pointers.
Figure 11B:
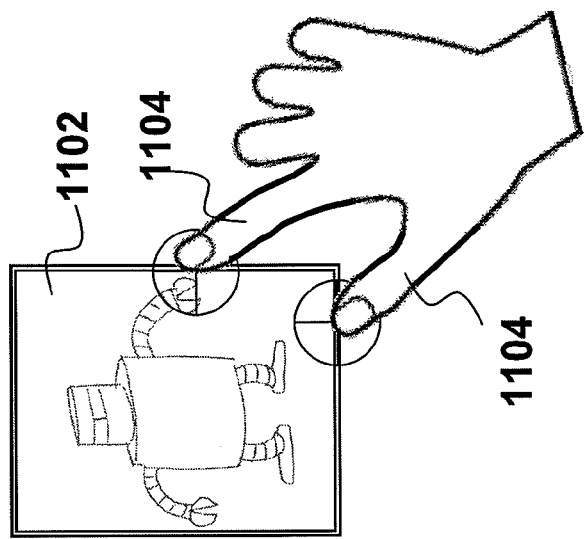
Figure 11A:
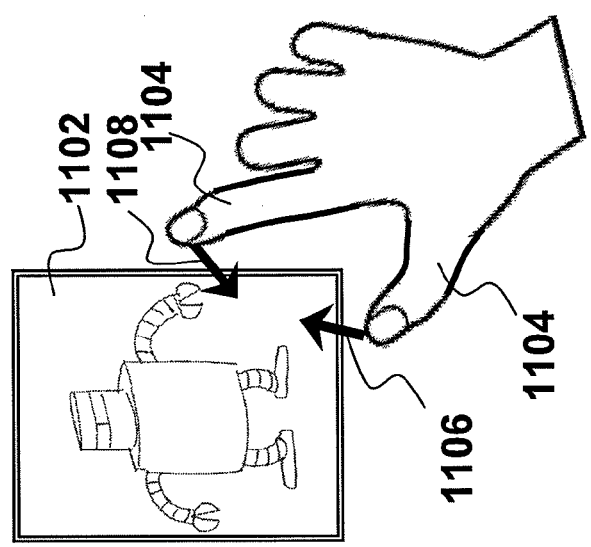
Figure 11D:
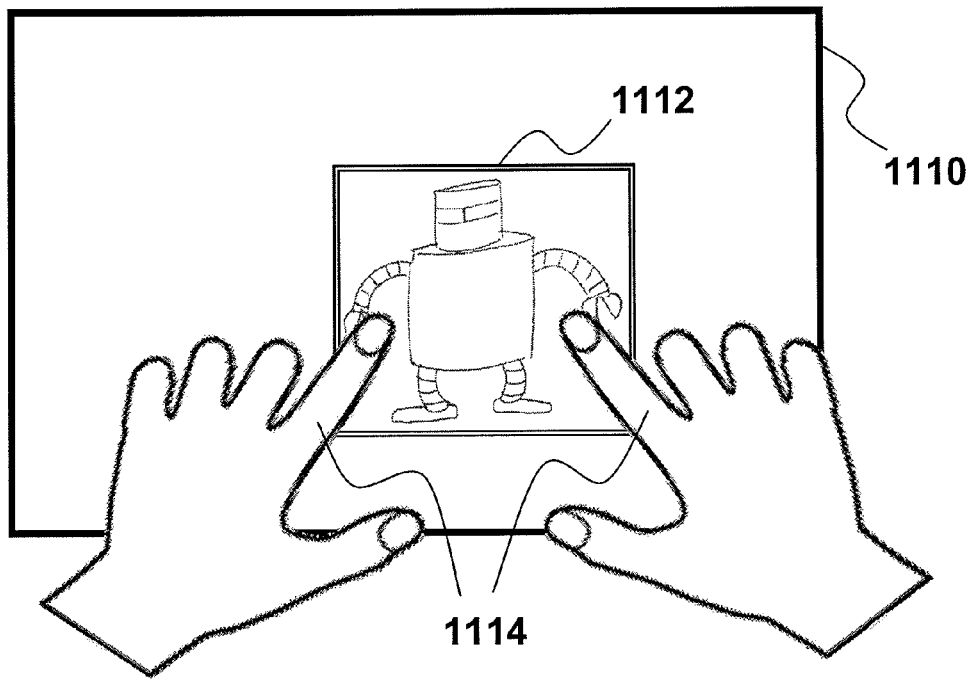

FIGS. 11a to 11c illustrate resizing a widget, in this case a picture 1102 using two pointers, in this case a user's fingers. In FIG. 11a, the user touches the two fingers 1104 on the background 306 near the picture 1102, and moves the fingers 1104 towards the picture 1102 in the directions shown by the two arrows 1106 and 1108, respectively. In FIG. 11b, when the touch points corresponding to fingers 1104 cross the two edges of the picture 1102, respectively, the two touch points are highlighted with a visual effect. The picture 1102 is then selected for manipulation. In FIG. 11c, with the fingers 1104 moving closer, the picture 1102 is manipulated so as to be shrunk to a smaller size.

Figure 11E:
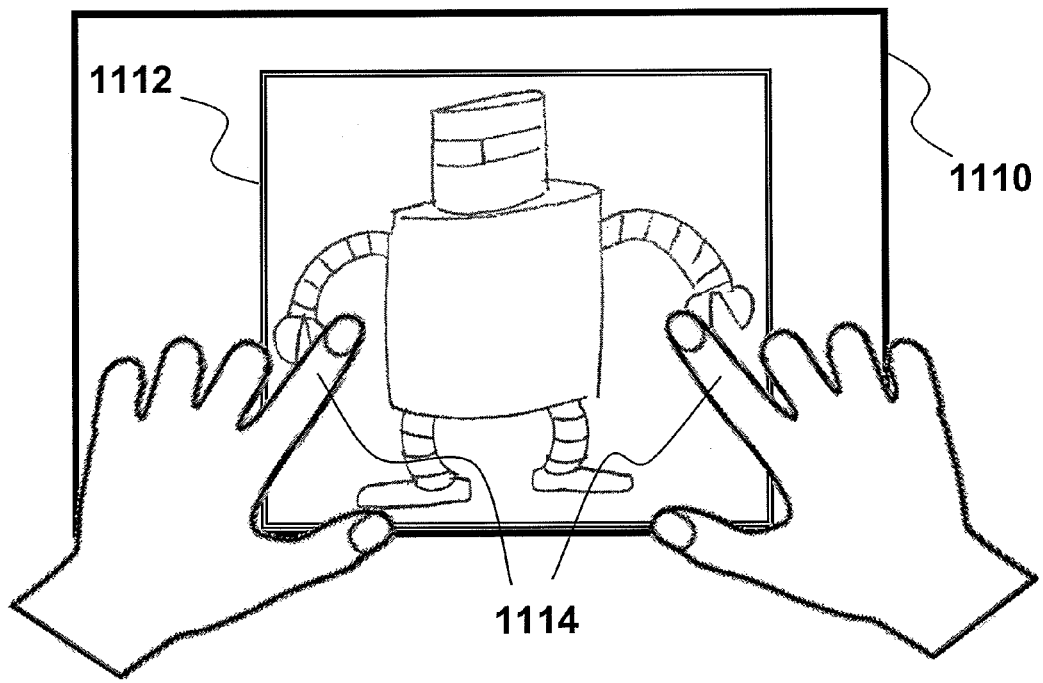
Figure 11F:
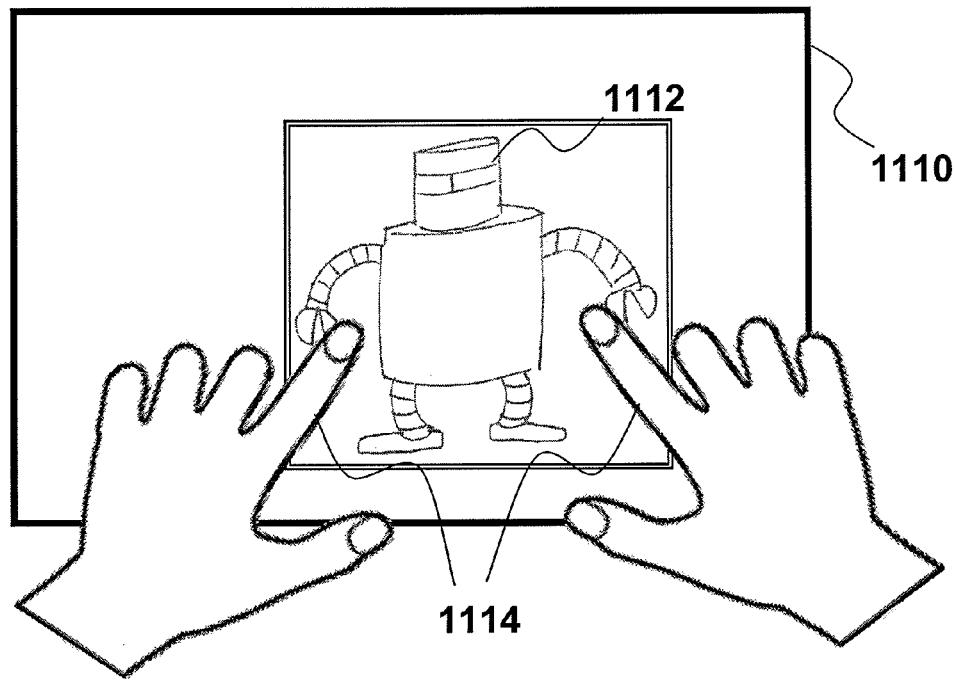
Figure 11G:
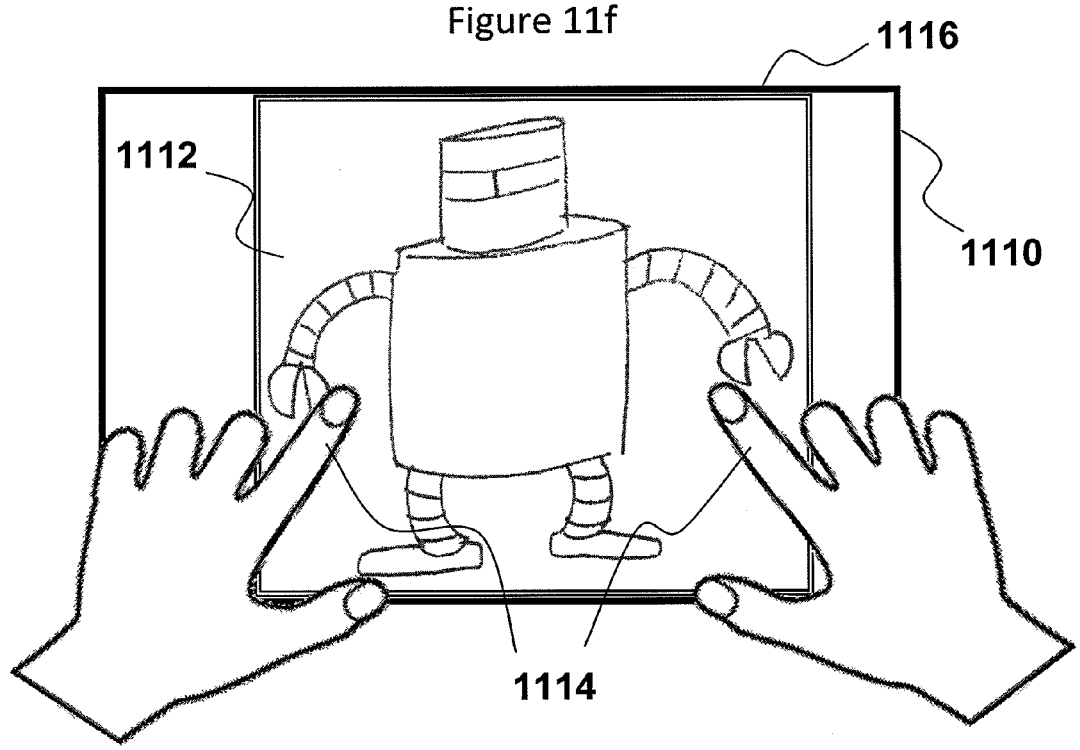

FIGS. 11d to 11g, another multiple finger scaling application is shown. On a touch panel 1110, a user contacts a graphic widget 1112 with multiple touch points 1114 in FIG. 11d. In FIG. 11e, the user enlarges the graphic widget 1112 by expanding the distance between touch points 1114 on the widget 1112 or at the edges of the widget 1112. In FIG. 11f, at a pre-determined maximum scaling value 1116, maximum scaling is achieved and the widget 1112 is automatically animated and enlarged as seen in FIG. 11g. The maximum scaling size 1116 is preferably very close in size to the size of the touch panel's display surface in order to prevent the automatic maximum scaling from accidentally being initiated as a widget is scaled. During the scaling, the widget remains centered on the touch panel and expands outwards to encompass the display area in order to assist with usability. This is particularly useful for presentations where enlarging a widget 1112 for maximum scaling and centering and straightening the enlarged widget 1112 without pushing the widget off of the display surface, or making other unwanted translations on the widget as challenging.

Other multiple touch gestures may be made to perform tasks on the maximum scaled widget 1112. A shrinking gesture, like that illustrated in FIG. 11C, results in the widget 1112 shrinking by a determined amount or being returned to its original size. Alternatively, a swiping gesture may transition to a next widget 1112 in a group of widgets 1112 in an application such as a slideshow.

Limits on the sizes and/or positions of widgets 1112 may be imposed by software applications running on processing structure 20, in order to prevent a user's actions from unduly interfering with another user's actions in a collaborative environment. For example, enabling one user to enlarge a graphic widget to encompass a majority of the display surface would occlude other users' display surface space and/or widgets. As such, collaborative software applications may limit the extent to which a particular widget may be enlarged, as described for example in U.S. patent application Ser. No. 12/241,030 entitled "METHOD FOR HANDLING INTERACTIONS WITH MULTIPLE USERS OF AN INTERACTIVE INPUT SYSTEM, AND INTERACTIVE INPUT SYSTEM EXECUTING THE METHOD", to Tse, et al. filed on Sep. 29, 2008 and assigned to the assignee of the subject application, the content of which is incorporated herein by reference in its entirety.

Figure 12C:
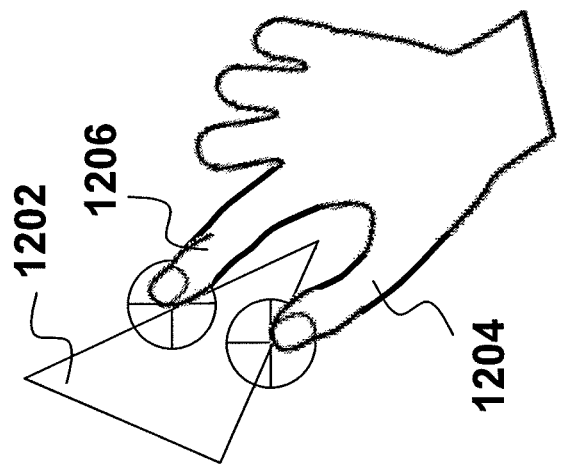
FIGS. 12a to 12c illustrate rotating a graphic widget using multiple pointers.
Figure 12B:
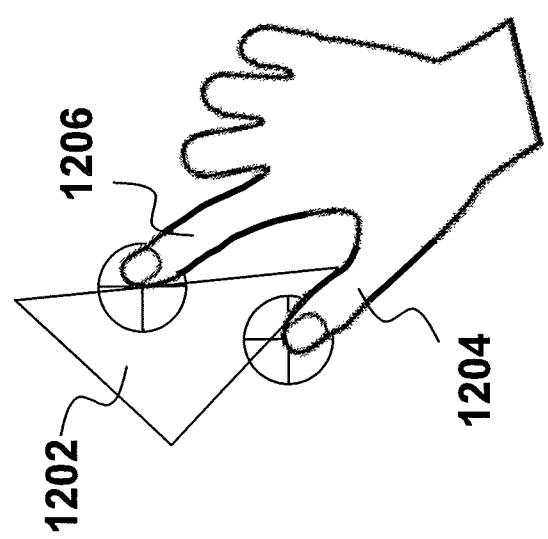
Figure 12A:
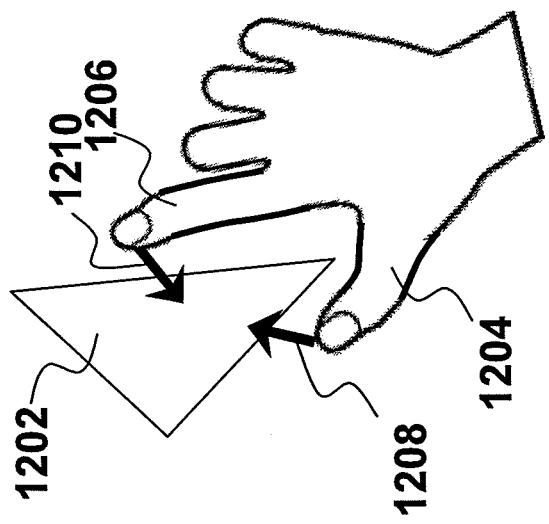

FIGS. 12a to 12c illustrates rotating a triangular widget 1202 using two pointers, in this case a thumb 1204 and forefinger 1206. In FIG. 12a, the user touches thumb 1204 and forefinger 1206 on the background 306 near the widget 1202, and moves the thumb 1204 and forefinger 1206 towards the widget 1202 in the directions shown by the arrows 1028 and 1210, respectively. In FIG. 12b, when the thumb 1204 and forefinger 1206 cross respective edges of the widget 1202, the two touch points are highlighted with a visual effect and the widget 1202 is automatically selected for manipulation by the thumb 1204 and forefinger 1206, as described above. In FIG. 12c, with the thumb 1204 moving to the right and the forefinger 1206 moving towards the left, the widget 1202 is rotated, as described above.

Figure 13B:
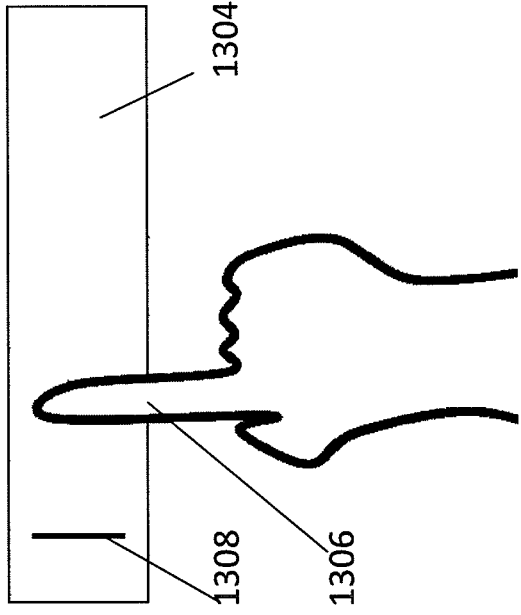
FIGS. 13a to 13b illustrate selecting an input prompt for user input.
Figure 13A:
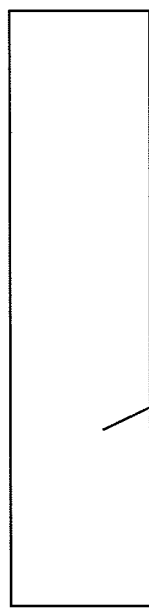

If desired, a new touch point directly hitting a widget may result in a different action than occurs when an existing touch point crosses a widget, as shown in FIGS. 13a to 13b and FIGS. 14a to 14c. In FIG. 13a, a text input widget containing a prompt 1302 and a text input box 1304 is shown. In FIG. 13b, a user directly touches the text input box 1304 using a pointer, in this case finger 1306. The Contact Event Monitor passes a Contact Down event to the text input widget. The text input widget interprets this as a desire by the user to enter text. As a result, a text input cursor 1308 is then shown in the text input box 1304, and the user may enter text using a keyboard. It will be noted that a keyboard graphical widget that receives input via contact on the touch panel 14 may be instantiated for this purpose, or the user may enter the text using a physical keyboard that is connected to processing structure 20.

Figure 14A:
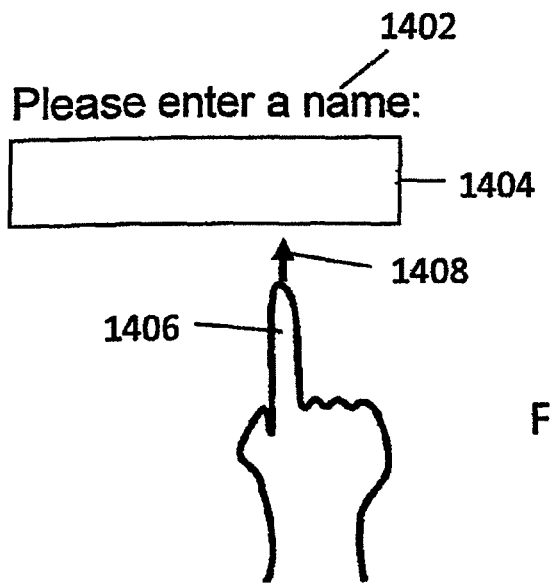
FIGS. 14a to 14c illustrate manipulating the input prompt of FIG. 13 using crossing methods.
Figures 14B, 14C:
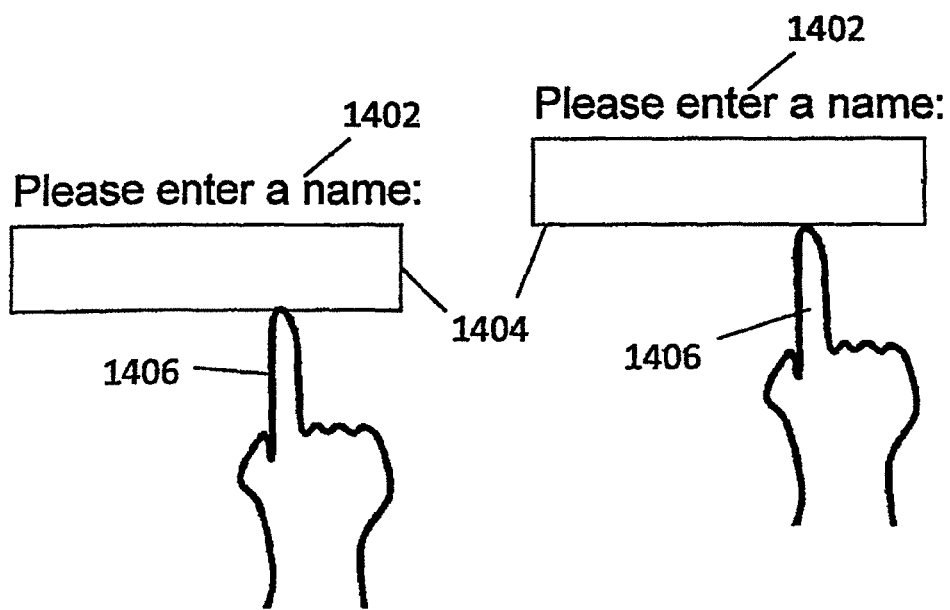

In FIG. 14a, a text input widget containing a prompt 1402 and a text input box 1404 is shown. A user first touches a pointer, in this case finger 1406, on the background 306, and moves the finger 1406 towards the text input widget in the direction shown by arrow 1408. In FIG. 14b, when the touch point corresponding to finger 1406 crosses the edge of the text input widget, the Contact Event Monitor passes a Contact Up event to the background 306, and a modified Contact Down event to the text input widget. The contact Down event passed to the text input widget is modified in the sense that the widget is made aware that the Contact Down event from this existing touch point is distinct from a Contact Down event from a new touch point. In response, the text input widget is selected for manipulation such as moving, rotating etc. as opposed to text entry. In FIG. 14c, the finger 1406 moves forward on the display surface, causing the text input widget 1402 to move to a new position.

FIG. 15a and 15b illustrate a presentation application using crossing gestures employing the crossing methods discussed in FIGS. 5a and 5b. In this embodiment, a user contacts the interior of a graphic widget 1500 with the touch point 1502 corresponding to a pointer, where previous user input 1504 was entered, and performs a sweeping gesture 1506 across the widget 1500. As the user moves the touch point 1502 across the interior 1510 of the widget 1500, and crosses over the edge of the widget 1500 to the outside of the widget or to the background 1512 in a substantially horizontal direction, the interior of the widget clears and the previous user input within the widget 1500 is erased. Such an application using crossing gestures is particularly useful for presentation applications where it is desirable to preserve as much display surface real estate as possible. Crossing gesture applications reduce or eliminate the need for additional user interface boxes prompting user inputs and confirmation which may obstruct an audience's view of critical information and graphics.

Figure 16:
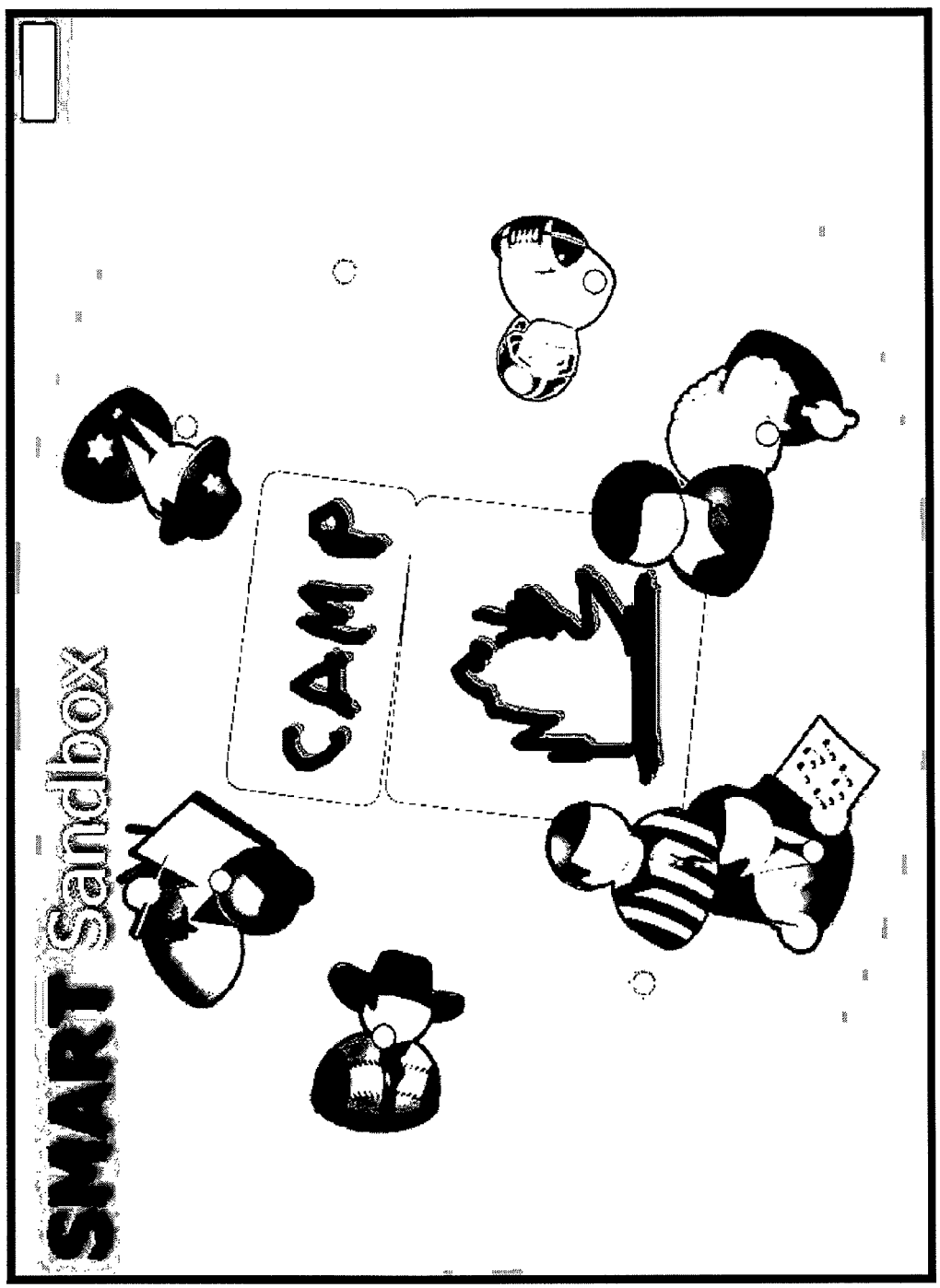
FIG. 16 illustrates another alternative application using crossing methods.

FIG. 16 illustrates another application employing the crossing methods described in FIGS. 5a and 5b. In this example, a crossing based interaction is used to dynamically develop, manipulate and animate presentation content in real time during a presentation. A presenter can animate the position of characters in real time using multiple fingers to rotate and translate the characters. As mentioned above, further details on collaborative software applications employing crossing gestures are described in the aforementioned U.S. patent application Ser. No. 12/241,030 to Tse, et al. "METHOD FOR HANDLING INTERACTIONS WITH MULTIPLE USERS OF AN INTERACTIVE INPUT SYSTEM, AND INTERACTIVE INPUT SYSTEM EXECUTING THE METHOD."

The method described above for selecting and manipulating a graphic object in an interactive input system may be embodied in a software application comprising computer executable instructions executed by the processing structure 20. The software application may comprise program modules including routines, programs, object components, data structures etc. and may be embodied as computer readable program code stored on a computer readable medium. The computer readable medium is any data storage device that can store data, which can thereafter be read by a processing structure 20. Examples of computer readable media include for example read-only memory, random-access memory, CD-ROMs, magnetic tape and optical data storage devices. The computer readable program code can also be distributed over a network including coupled computer systems so that the computer readable program code is stored and executed in a distributed fashion.

The interactive input system may comprise program modules including but not limited to routines, programs, object components, data structures etc. and may be embodied as computer readable program code stored on a computer readable medium. The computer readable medium is any data storage device that can store data, which can thereafter be read by a computer system. Examples of computer readable medium include for example read-only memory, random-access memory, flash memory, CD-ROMs, magnetic tape, optical data storage devices and other storage media. The computer readable program code can also be distributed over a network including coupled computer systems so that the computer readable program code is stored and executed in a distributed fashion or copied over a network for local execution.

Although the embodiments described above are based on multiple-touch interactive input systems, those of skill in the art will appreciate that many of the same techniques can also be applied to single-touch systems, allowing the user smoothly select and manipulate graphic widgets by using a single pointer.

Although the embodiments described above are based on a touch surface, those of skill in the art will appreciate that the edge contact techniques could be applied to a conventional mouse and keyboard input system, or other input systems such as a joystick, trackball or combination thereof Other shapes, for example, a circular area centering at the position (X,Y) and having a radius R, may also be used to define the touch area. Those skilled in the art will appreciate that different shapes of touch area are minor modifications of the algorithm that do not depart from the spirit and scope of this invention.

However, those skilled in the art will appreciate that, according to alternative embodiments, the background 306 can also be made to perform some actions responding to the received contact events in some embodiments.

Although embodiments have been described, those of skill in the art will appreciate that variations and modifications may be made without departing from the spirit and scope thereof as defined by the appended claims.

What is claimed is:

1. A computer implemented method of erasing user input displayed in a graphic widget positioned on a background of an interactive input system comprising:
    detecting contact of a new touch point at a location coinciding with the graphic widget;
    tracking the new touch point associated with the graphic widget; and
    in the event that the new touch point that is associated with the graphic widget crosses an edge of the graphic widget as it is moved from a location coinciding with the graphic widget to a location outside of the graphic widget, erasing the user input displayed in the graphic widget.

2. The method of claim 1, wherein the user input comprises inputted text.

3. The method of claim 1, wherein the user input comprises an object.

4. The method of claim 1, wherein the user input comprises a horizontal motion.

* * * * *